(12) United States Patent
Park et al.

(10) Patent No.: US 10,908,712 B2
(45) Date of Patent: Feb. 2, 2021

(54) METHOD FOR RECOGNIZING ROTATION OF ROTATING BODY AND ELECTRONIC DEVICE FOR PROCESSING THE SAME

(71) Applicant: SAMSUNG ELECTRONICS CO., LTD., Suwon-si (KR)

(72) Inventors: Nojoon Park, Seongnam-si (KR); Jae Woo Seol, Seoul (KR); Geon-Soo Kim, Suwon-si (KR); Yongjoon Jeon, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 15/335,515

(22) Filed: Oct. 27, 2016

(65) Prior Publication Data

US 2017/0131795 A1   May 11, 2017

(30) Foreign Application Priority Data

Nov. 5, 2015   (KR) .......................... 10-2015-0155165

(51) Int. Cl.
*G06F 3/0362* (2013.01)
*G06F 3/0482* (2013.01)
(Continued)

(52) U.S. Cl.
CPC ............ *G06F 3/0362* (2013.01); *G06F 1/163* (2013.01); *G06F 1/1643* (2013.01);
(Continued)

(58) Field of Classification Search
CPC .... G06F 3/0312; G06F 3/0362; G06F 3/0485; G06F 3/04845
See application file for complete search history.

(56) References Cited

U.S. PATENT DOCUMENTS

2001/0050883 A1   12/2001   Farine et al.
2006/0250358 A1   11/2006   Wroblewski
(Continued)

FOREIGN PATENT DOCUMENTS

AU   2015101203   10/2015
CN   1327779 A   12/2001
(Continued)

OTHER PUBLICATIONS

Extended Search Report dated Mar. 15, 2017 in counterpart European Patent Application No. 16195919.2.
(Continued)

*Primary Examiner* — Patrick F Marinelli
(74) *Attorney, Agent, or Firm* — Nixon & Vanderhye P.C.

(57) ABSTRACT

Disclosed are a method for recognizing a rotation of a rotating body and an electronic device for processing the same. The electronic device may include a housing; a rotatable input configured to be mounted on a part of the housing; a display configured to be exposed out of a part of the housing; a memory; and a processor electrically connected to the memory, the input, and the display, wherein the memory may store instructions that, when executed by the processor, cause the processor to display, on the display, at least one part of a user interface including a first point capable of scrolling an object and/or a number in proportion to a rotation of the input; to at least partially respond to a first input from the input or the display and to display, on the display, a second point spaced by a predetermined distance or angle from the first point; and to move the object to the second point or to display, on the display, a corresponding number at the second point, in response to the rotation of the input in a state of displaying the second point.

15 Claims, 23 Drawing Sheets

(51) Int. Cl.
  *G06F 3/0481* (2013.01)
  *G06F 1/16* (2006.01)
  *G06F 3/0484* (2013.01)
  *G06F 3/0485* (2013.01)
  *G06F 3/0488* (2013.01)

(52) U.S. Cl.
  CPC .......... *G06F 1/1684* (2013.01); *G06F 3/0482* (2013.01); *G06F 3/0485* (2013.01); *G06F 3/04817* (2013.01); *G06F 3/04842* (2013.01); *G06F 3/04845* (2013.01); *G06F 3/0488* (2013.01)

(56) References Cited

U.S. PATENT DOCUMENTS

| | | | |
|---|---|---|---|
| 2008/0174562 A1 | 7/2008 | Kim | |
| 2014/0143737 A1* | 5/2014 | Mistry | G06F 3/0488 715/854 |
| 2015/0248235 A1* | 9/2015 | Offenberg | G06F 3/04886 715/773 |
| 2016/0239142 A1* | 8/2016 | Kim | G06F 3/0416 |
| 2016/0299604 A1* | 10/2016 | Ida | G06F 3/044 |
| 2016/0306442 A1* | 10/2016 | Lee | G06F 3/0362 |
| 2016/0313810 A1* | 10/2016 | Kim | G06F 3/0362 |
| 2016/0320756 A1* | 11/2016 | Lee | G04G 21/08 |
| 2016/0334888 A1* | 11/2016 | Park | G06F 3/0362 |
| 2017/0016748 A1* | 1/2017 | Song | G01D 5/58 |
| 2017/0075305 A1* | 3/2017 | Ryu | G04G 9/0064 |
| 2017/0115860 A1* | 4/2017 | Youn | G06F 3/0482 |
| 2017/0131795 A1* | 5/2017 | Park | G06F 3/0362 |
| 2017/0176950 A1* | 6/2017 | Jung | G04B 19/225 |
| 2017/0315716 A1* | 11/2017 | Zambetti | G06F 3/0362 |

FOREIGN PATENT DOCUMENTS

| | | |
|---|---|---|
| CN | 1804767 A | 7/2006 |
| KR | 10-2008-0024472 | 3/2008 |
| KR | 10-2008-0068781 | 7/2008 |
| WO | 96/36960 | 11/1996 |
| WO | 2015/034969 | 3/2015 |

OTHER PUBLICATIONS

European Office Action for EP Application No. 16 195 919.2 dated Jun. 20, 2018.
European Office Action dated Jun. 18, 2019 for EP Application No. 16195919.2.
European Office Action dated Jan. 7, 2020 for EP Application No. 16 195 919.2.
Chinese Office Action dated Oct. 9, 2020 for CN Application No. 201610978285.5.
European Office Action dated Oct. 16, 2020 for EP Application No. 16195919.2.

\* cited by examiner

METHOD FOR RECOGNIZING ROTATION OF ROTATING BODY AND ELECTRONIC DEVICE FOR PROCESSING THE SAME

CROSS-REFERENCE TO RELATED APPLICATION

This application is based on and claims priority under 35 U.S.C. § 119 to Korean Application Serial No. 10-2015-0155165, which was filed in the Korean Intellectual Property Office on Nov. 5, 2015, the content of which is incorporated by reference herein in its entirety.

TECHNICAL FIELD

The present disclosure relates generally to an apparatus and a method for sensing a rotation of a rotating body included in an electronic device.

BACKGROUND

Recently, with the progress of the digital technology, electronic devices, such as a mobile communication terminal, a Personal Digital Assistant (PDA), an electronic organizer, a smart phone, a tablet Personal Computer (PC), and the like, which can perform communication and can process personal information while moving, are being variously released. The electronic device has various functions, such as a voice call function, a message transmission function (e.g., a Short Message Service (SMS), a Multimedia Messaging Service (MMS), etc.), a video call function, an electronic organizer function, an image-capturing function, an email transmission/reception function, a broadcast reproduction function, an Internet function, a music reproduction function, a schedule management function, a Social Network Service (SNS) function, a messenger function, a dictionary function, a game function, and the like.

Meanwhile, as one type of electronic devices, wearable devices which can be directly worn by the bodies and can be used have been developed. For example, wearable devices may have various forms of being detachable/attachable from/to a part of the body or clothes, such as a head-mounted display, smart glasses, a smart watch, a wristband, a contact lens-type device, a ring-type device, a shoe-type device, a clothing-type device, a glove-type device, and the like. The wearable devices can be used in a state of being connected to the electronic device.

An electronic device of a wrist watch type may have a rotating body as an input means disposed on an outer part of the electronic device, and may select a menu and an item displayed on a display unit of the electronic device by rotating the rotating body. At this time, when an item is selected by rotating the rotating body, it is necessary to repeatedly rotate the rotating body several times as the number of items increases.

SUMMARY

Various example embodiments of the present disclosure can provide a method and an apparatus for selecting an item while reducing the number of times of rotation of a rotating body.

In accordance with an example aspect of the present disclosure, an electronic device is provided. The electronic device may include a housing; a rotatable input configured to be mounted on a part of the housing; a display configured to be exposed out of a part of the housing; a memory; and a processor electrically connected to the memory, the input, and the display. According to an embodiment of the present disclosure, the memory may store instructions that, when executed by the processor, cause the processor to display, on the display, at least one part of a user interface including a first point capable of scrolling an object and/or a number in proportion to a rotation of the input; to at least partially respond to a first input from the input or the display and to display, on the display, a second point spaced by a predetermined distance or angle from the first point; and to move the object to the second point or to display, on the display, a corresponding number at the second point, in response to the rotation of the input in a state of displaying the second point.

In accordance with another example aspect of the present disclosure, an operating method of an electronic device is provided. The operating method may include displaying, on a display of the electronic device, at least one part of a user interface including a first point capable of scrolling an object and/or a number in proportion to a rotation of an input unit; at least partially responding to a first input received from an input of the electronic device or the display and displaying, on the display, a second point spaced by a predetermined distance or angle from the first point; and moving the object to the second point or displaying, on the display, a corresponding number at the second point, in response to the rotation of the input in a state of displaying the second point.

In accordance with still another example aspect of the present disclosure, a non-transitory computer-readable recording medium is provided. The computer-readable recording medium may store a program which, when executed by a processor cause the processor to perform operations comprising: displaying, on a display, at least one part of a user interface including a first point capable of scrolling an object and/or a number in proportion to a rotation of an input; at least partially responding to a first input from the input or the display and displaying, on the display, a second point spaced by a selected distance or angle from the first point; and moving the object to the second point or displaying, on the display, a corresponding number at the second point, in response to the rotation of the input in a state of displaying the second point.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

DETAILED DESCRIPTION

Figure 1:
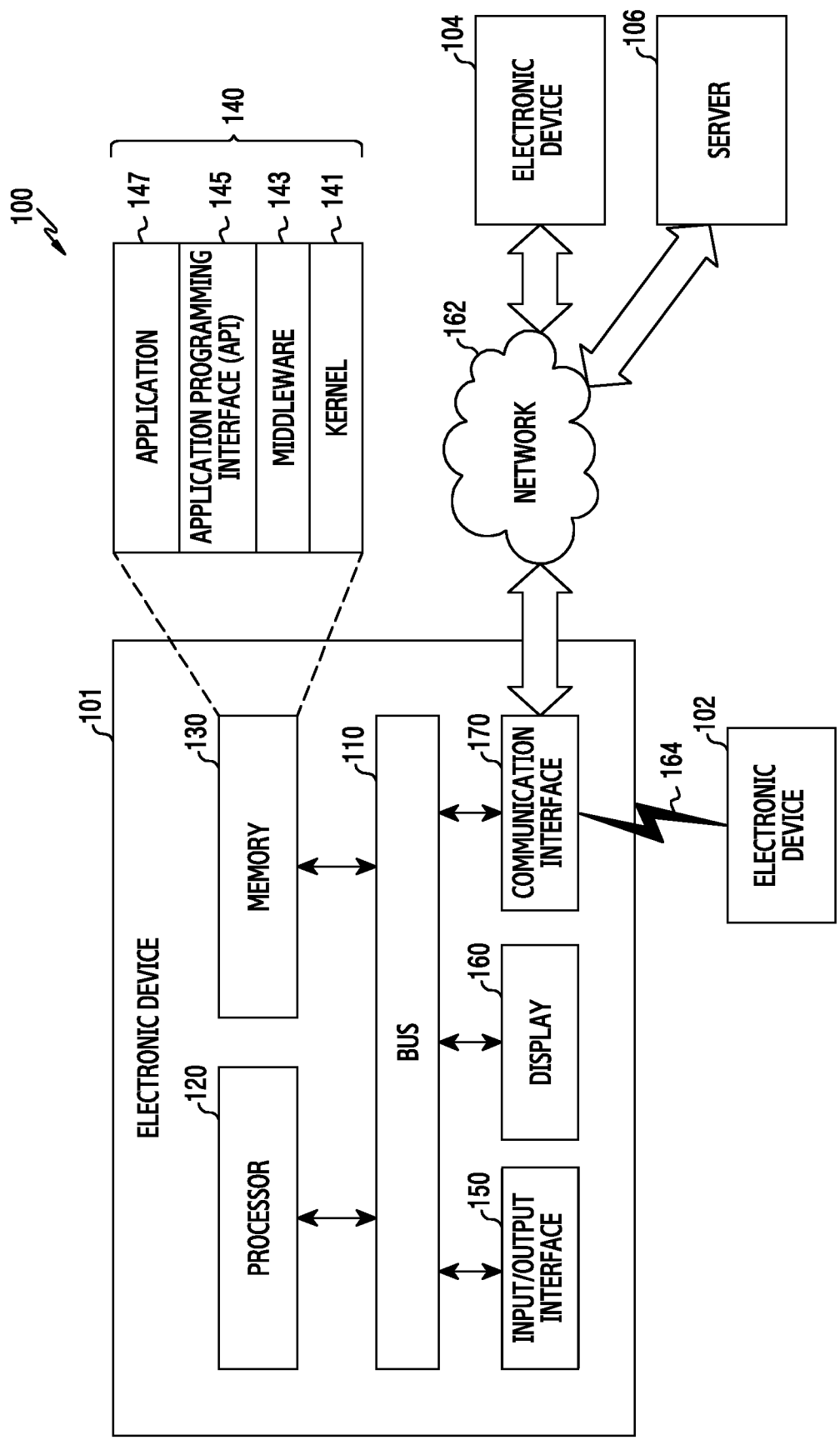
FIG. 1 is a block diagram illustrating an example electronic device in a network environment according to various example embodiments of the present disclosure.

Hereinafter, various example embodiments of the present disclosure will be described with reference to the accompanying drawings. In the following description, specific details such as detailed configuration and components are merely provided to aid in the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments illustrated in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" may mean (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may refer, for example, to the situation in which the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device. For example, the electronic device according to various embodiments of the present disclosure may include at least one of: a smart phone; a tablet personal computer (PC); a mobile phone; a video phone; an e-book reader; a desktop PC; a laptop PC; a netbook computer; a workstation, a server, a personal digital assistant (PDA); a portable multimedia player (PMP); an MP3 player; a mobile medical device; a camera; or a wearable device (e.g., a head-mount-device (HMD), an electronic glasses, an electronic clothing, an electronic bracelet, an electronic necklace, an electronic appcessory, an electronic tattoo, a smart mirror, or a smart watch), or the like, but is not limited thereto.

In other embodiments, an electronic device may be a smart home appliance. For example, of such appliances may include at least one of: a television (TV); a digital video disk (DVD) player; an audio component; a refrigerator; an air conditioner; a vacuum cleaner; an oven; a microwave oven; a washing machine; an air cleaner; a set-top box; a home automation control panel; a security control panel; a TV box (e.g., Samsung HomeSync™, Apple TV™, or Google TV™); a game console (e.g., Xbox™, Play Station™); an electronic dictionary; an electronic key; a camcorder; or an electronic frame, or the like, but is not limited thereto.

In other embodiments, an electronic device may include at least one of: a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine); a navigation device; a global positioning system (GPS) receiver; an event data recorder (EDR); a flight data recorder (FDR); an in-vehicle infotainment device; an electronic equipment for a ship (e.g., ship navigation equipment and/or a gyrocompass); an avionics equipment; a security equipment; a head unit for vehicle; an industrial or home robot; an automatic teller's machine (ATM) of a financial institution, point of sale (POS) device at a retail store, or an internet of things device (e.g., a Lightbulb, various sensors, an electronic meter, a gas meter, a sprinkler, a fire alarm, a thermostat, a streetlamp, a toaster, a sporting equipment, a hot-water tank, a heater, or a boiler and the like), or the like, but is not limited thereto.

In certain embodiments, an electronic device may include at least one of: a piece of furniture or a building/structure; an electronic board; an electronic signature receiving device; a projector; and various measuring instruments (e.g., a water meter, an electricity meter, a gas meter, or a wave meter), or the like, but is not limited thereto.

An electronic device according to various embodiments of the present disclosure may also include a combination of one or more of the above-mentioned devices. Further, it will be apparent to those skilled in the art that an electronic device according to various embodiments of the present disclosure is not limited to the above-mentioned devices.

FIG. 1 is a diagram illustrating an example network environment 100 including an electronic device 101 according to various example embodiments. Referring to FIG. 1, the electronic device 101 may include a bus 110, a processor 120, a memory 130, an input/output (I/O) interface (e.g., including input/output circuitry) 150, a display 160, and a communication interface (e.g., including communication circuitry) 170.

The bus 110 may be a circuit for connecting the above-described elements (e.g., the processor 120, the memory 130, the I/O interface 150, the display 160 or the communication interface 170, etc.) with each other, and transferring communication (e.g., a control message) between the above-described elements.

The processor 120 may include a central processing unit (CPU), a communication processor (CP), a graphic processing unit (GPU).

The processor 120 may receive, for example, an instruction from the above-described other elements (e.g., the memory 130, the I/O interface 150, the display 160, or the communication interface 170, etc.) via the bus 110, decipher the received instruction, and execute an operation or a data process corresponding to the deciphered instruction.

The memory 130 may include any suitable type of volatile or non-volatile memory. The memory 130 may store an instruction or data received from the processor 120 or other elements (e.g., the I/O interface 150, the display 160, or the communication interface 170, etc.), or generated by the processor 120 or other elements. The memory 130 may include, for example, programming modules 140 such as a kernel 141, a middleware 143, an application programming interface (API) 145, or an application 147. The each of the programming modules may be configured using a software, a firmware, a hardware, or a combination of two or more of these.

The kernel 141 may control or manage system resources (e.g., the bus 110, the processor 120, or the memory 130, etc.) used for executing an operation or a function implemented in the rest of the programming modules, for example, the middleware 143, the API 145, or the application 147. Also, the kernel 141 may provide an interface for allowing the middleware 143, the API 145, or the application 147 to access an individual element of the electronic device 101 and control or manage the same.

The middleware 143 may perform a mediation role so that the API 145 or the application 147 may communicate with the kernel 141 to give and take data. Also, in connection with task requests received from the applications 147, the middleware 143 may perform a control (e.g., scheduling or load balancing) for a task request using, for example, a method of assigning priority that may use a system resource (e.g., the bus 110, the processor 120, or the memory 130, etc.) of the electronic device 101 to at least one application 134.

The API 145 is an interface for allowing the application 147 to control a function provided by the kernel 141 or the middleware 143, and may include at least one interface or function (e.g., an instruction) for file control, window control, image processing, or character control, etc.

The I/O interface 150 may include various I/O interface circuitry configured to transfer an instruction or data input from a user via an I/O unit (e.g., a sensor, a keyboard, or a touchscreen) to the processor 120, the memory 130, or the communication interface 170 via the bus 110, for example. For example, the I/O interface 150 may provide data regarding a user's touch input via the touchscreen to the processor 120. Also, the I/O interface 150 may, for example, output an instruction or data received via the bus 110 from the processor 120, the memory 130, or the communication interface 170 via the I/O unit (e.g., a speaker or a display). For example, the I/O interface 150 may output voice data processed by the processor 120 to a user via a speaker.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display, or the like, but is not limited thereto. The display 160 may display various types of contents (for example, text, images, videos, icons, or symbols) for users. The display 160 may include a touch screen, and may receive, for example, a touch, gesture, proximity, or hovering input by using an electronic pen or a part of the user's body.

The communication interface 170 may include various communication circuitry configured to connect communication 164 between the electronic device 101 and an external device (for example, the electronic device 104 or the server 106). For example, the communication interface 170 may be connected to a network 162 through wireless communication or wired communication, and may communicate with an external device.

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM) as a cellular communication protocol.

The wired communication may include, for example, at least one of universal serial bus (USB), high definition multimedia interface (HDMI), recommended standard 232 (RS-232), and plain old telephone service (POTS).

The network 162 may include at least one of communication networks such as a computer network (for example, a LAN or a WAN), the Internet, and a telephone network.

The electronic devices 102 and 104 may be devices of the same type as that the electronic device 101 or devices of different types from that of the electronic device 101. According to an embodiment, the server 106 may include a group of one or more servers. According to various embodiments, all or some of the operations executed in the electronic device 101 may be carried out in another electronic device or a plurality of electronic devices (for example, the electronic device 102 or 104 and the server 106). According to an embodiment, when the electronic device 101 should perform some functions or services automatically or by a request, the electronic device 101 may make a request for performing at least some functions related to the functions or services to another device (for example, the electronic device 102 or 104, or the server 106) instead of performing the functions or services by itself or additionally. The electronic device (for example, the electronic device 102 or 104, or the server 106) may carry out the functions requested by the electronic device 101 or additional functions and provide results thereof to the electronic device 101. The electronic device 101 may provide the requested functions or services to another electronic device based on the received results or after additionally processing the received results. To this end, for example, cloud computing, distributed computing, or client-server computing technology may be used.

Figure 2:
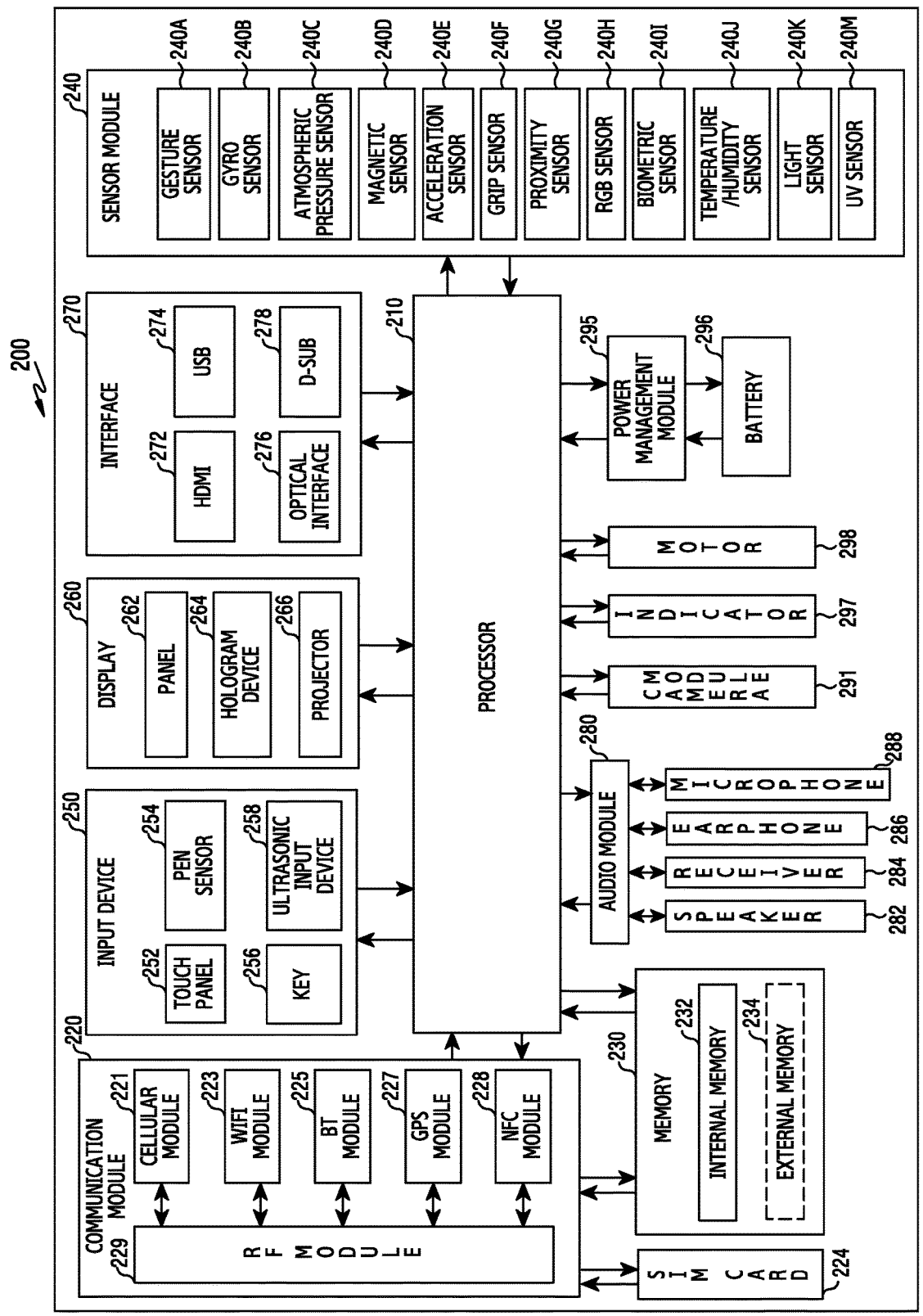
FIG. 2 is a block diagram illustrating an example configuration of an electronic device according to various example embodiments of the present disclosure.

FIG. 2 is a block diagram 200 illustrating an example electronic device 201 according to various example embodiments of the present disclosure. The electronic device 201 may configure, for example, all or a portion of the electronic device 101 illustrated in FIG. 1. Referring to FIG. 2, the electronic device 201 may include one or more application processors (AP) 210, a communication module (e.g., including communication circuitry) 220, a subscriber identification module (SIM) card 224, a memory 230, a sensor module 240, an input unit (e.g., including input circuitry) 250, a display 260, an interface (e.g., including interface circuitry) 270, an audio module 280, a camera module 291, a power management module 295, a battery 296, an indicator 297, or a motor 298.

The AP 210 may drive an OS or an application to control a plurality of hardware or software elements connected to the AP 210, and perform various data processes including multimedia data and operations. The AP 210 may be implemented, for example, as a system on chip (SoC). According to an embodiment, the AP 210 may further include at least one of a graphic processing unit (GPU) or image signal processor. According to an embodiment, the AP 210 may be implemented to include at least a portion (e.g., the cellular module 221) of the above-described elements. Also, the AP 210 may stores data received from at least one of other elements or generated by at least one of other elements in a non-volatile memory.

The communication module 220 (e.g., the communication interface 160) may include various communication circuitry configured to perform data transmission/reception in communication between the electronic device 201 (e.g., the electronic device 21) and other electronic devices (e.g., the electronic device 24 or the server 26) connected via a network. According to an embodiment, the communication module 220 may include various communication circuitry, such as, for example, and without limitation, a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, etc. via a communication network (e.g., LTE, LTE-A, CDMA, WCDMA, UMTS, WiBro, or GSM, etc.). Also, the cellular module 221 may perform discrimination and authentication of an electronic device within a communication network using, for example, a subscriber identity module (e.g., a SIM card 224). According to an embodiment, the cellular module 221 may perform at least a portion of functions that may be provided by the AP 210. According to an embodiment, the cellular module 221 may include a communication processor (CP). Also, the cellular module 221 may be, for example, implemented as a SoC. Though elements such as the cellular module 221 (e.g., a communication processor), the memory 230, or the power management module 295, etc. are illustrated as elements separated from the AP 210 in FIG. 2, according to an embodiment, the AP 210 may be implemented to include at least a portion (e.g., the cellular module 221) of the above-described elements.

Each of the Wi-Fi module 223, the BT module 225, the GPS module 227, or the NFC module 228 may include, for example, a processor for processing data transmitted/received via a relevant module. Though the cellular module 221, the Wi-Fi module 223, the BT module 225, the GPS module 227, or the NFC module 228 are illustrated as separate blocks in FIG. 2, according to an embodiment, at least a portion (e.g., two or more elements) of the cellular module 221, the Wi-Fi module 223, the BT module 225, the GPS module 227, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 227, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), etc., though not shown. Also, the RF module 229 may further include a part for transmitting/receiving an electromagnetic wave on a free space in wireless communication, for example, a conductor or a conducting line, etc. Though FIG. 2 illustrates the cellular module 221, the Wi-Fi module 223, the BT module 225, the GPS module 227, and the NFC module 228 share one RF module 229, according to an embodiment, at least one of the cellular module 221, the Wi-Fi module 223, the BT module 225, the GPS module 227, or the NFC module 228 may perform transmission/reception of an RF signal via a separate RF module.

The SIM card 224 may be a card including a subscriber identity module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 20) may include a built-in memory 232 or an external memory 234. The built-in memory 232 may include, for example, at least one of a volatile memory (e.g., dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, NAND flash memory, NOR flash memory, etc.).

According to an embodiment, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment, the electronic device 201 may further include a storage device (or a storage medium) such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., RGB (red, green, blue) sensor), a living body (e.g., biometric) sensor 240I, a temperature/humidity sensor 240J, an illuminance (e.g., ambient light) sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), etc. The sensor module 240 may further include a control circuit for controlling at least one sensor belonging thereto.

The input unit 250 may include various input circuitry, such as, for example, and without limitation, a touch panel 252, a (digital) pen sensor 254, a key 256, or an ultrasonic input unit 258. The touch panel 252 may recognize a touch input using at least one of capacitive, resistive, infrared, or ultrasonic methods. Also, the touch panel 252 may further include a control circuit. A capacitive touch panel may perform detection by a physical contact or proximity recognition. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless recognition. According to an embodiment, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), etc. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment, the display 260 may further include a control circuit for controlling the panel 262, the hologram device 264, or the projector 266.

The interface 270 may include various interface circuitry, such as, for example, and without limitation, a high-definition multimedia interface (HDMI) 272, a universal serial bus (USB) 274, an optical interface 276, or a D-subminiature (D-sub) 278. The interface 270 may be included, for example, in the communication interface 160 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may convert a sound and an electric signal in dual directions. At least a partial element of the audio module 280 may be included, for example, in the I/O interface 140 illustrated in FIG. 1. The audio module 280 may process sound information input or output via, for example, a speaker 282, a receiver 284, an earphone 286, or a microphone 288, etc.

The camera module 291 is a device that may shoot a still image and a moving picture. According to an embodiment, the camera module 291 may include one or more image sensors (e.g., a front sensor or a rear sensor), a lens (not shown), an image signal processor (ISP) (not shown), or a flash (not shown) (e.g., an LED or xenon lamp).

The power management module 295 may manage power of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or a SoC semiconductor. A charging method may be classified into a wired charging method and a wireless charging method. The charging IC may charge a battery and prevent introduction of an overvoltage or an overcurrent from a charger. According to an embodiment, the charging IC may include a charging IC for at least one of the wired charging method and the wireless charging method. The wireless charging method may be, for example, a magnetic resonance method, a magnetic induction method, or an electromagnetic wave method, etc., and may additionally include an additional circuit for wireless charging, for example, a circuit such as a coil loop, a resonance circuit, or a rectifier, etc.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 210), for example, a booting state, a message state, or a charging state, etc. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), or a media flow, etc.

The aforementioned elements of the electronic device according to various embodiments of the present disclosure may be comprised of one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

Figure 3:
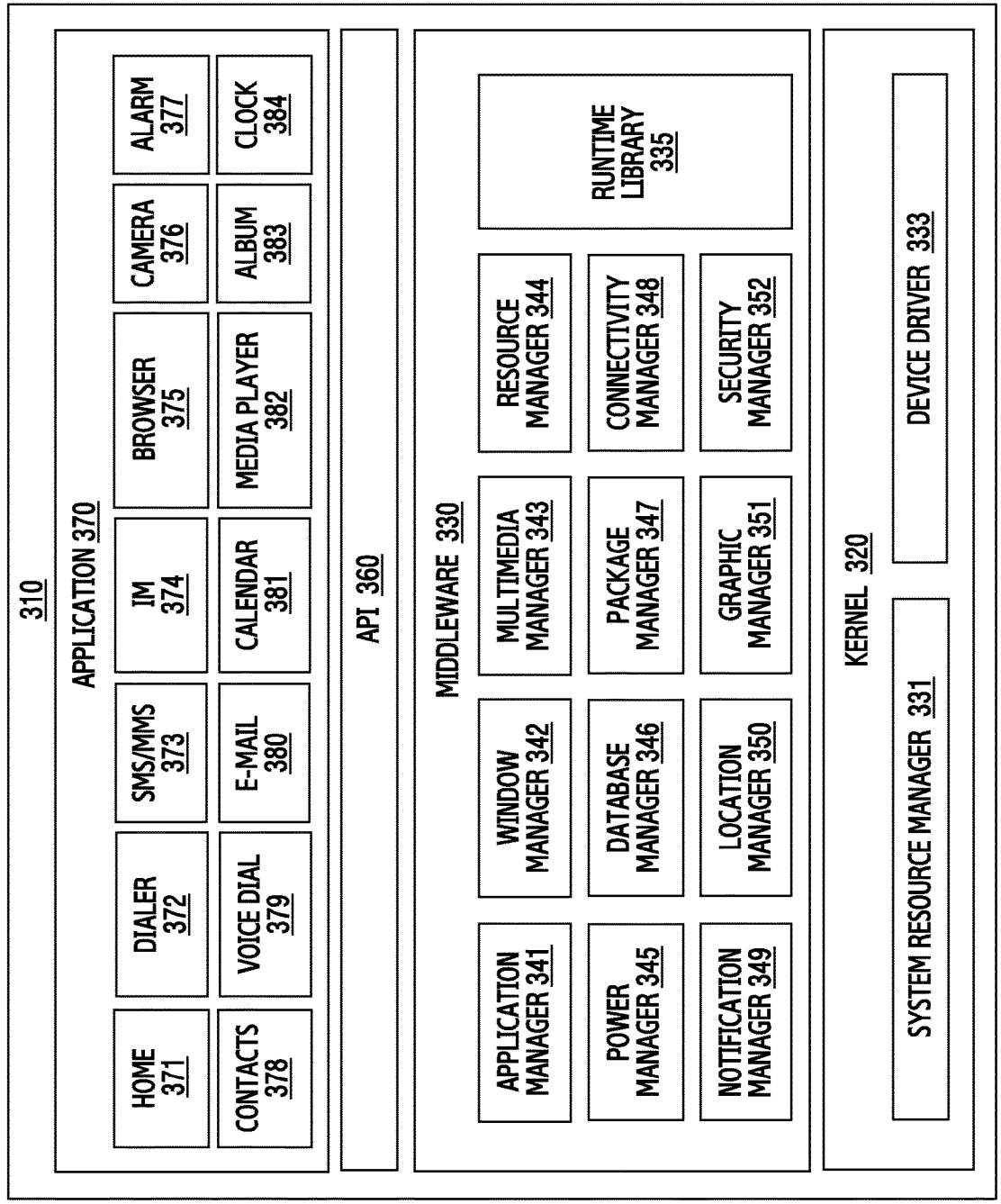
FIG. 3 is a block diagram illustrating an example configuration of a program module according to various example embodiments of the present disclosure.

FIG. 3 is a block diagram 300 of a program module 310 according to various embodiments of the present disclosure.

According to an embodiment, the program module 310 (for example, the programs 140) may include an Operating System (OS) for controlling resources related to the electronic device (for example, the electronic device 100) and/or various applications (for example, the application programs 147) executed in the operating system. The operating system may be, for example, Android, iOS, Windows, Symbian, Tizen, Bada, or the like.

The programming module 310 may include a kernel 320, middleware 330, an API 360, and/or applications 370. At least some of the program module 310 may be preloaded in the electronic device or downloaded from the server.

The kernel 320 (for example, the kernel 141 of FIG. 1) may include, for example, a system resource manager 331 or a device driver 333. The system resource manager 331 may control, allocate, or collect the system resources. According to an embodiment, the system resource manager 331 may include a process management unit, a memory management unit, or a file system management unit. The device driver 333 may include, for example, a display driver, a camera driver, a Bluetooth driver, a shared-memory driver, a USB driver, a keypad driver, a WiFi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses to add new functions through a programming language while the application 370 is executed. The runtime library 335 may perform input/output management, memory management, or a function for an arithmetic function.

The application manager 341 may manage, for example, a life cycle of at least one of the applications 370. The window manager 342 may manage Graphical User Interface (GUI) resources used by a screen. The multimedia manager 343 may grasp formats required for the reproduction of various media files, and may perform an encoding or decoding of the media file by using a codec suitable for the corresponding format. The resource manager 344 may manage resources such as a source code, a memory, and a storage space of at least one of the applications 370.

The power manager 345 may operate together with a Basic Input/Output System (BIOS) to manage a battery or power and may provide power information required for the operation of the electronic device. The database manager 346 may generate, search for, or change a database to be used by at least one of the applications 370. The package manager 347 may manage the installation or the updating of applications distributed in the form of package file.

The connectivity manager 348 may manage wireless connection of, for example, Wi-Fi or Bluetooth. The notification manager 349 can display or notify of an event such as an arrival message, promise, proximity notification, and the like in such a way that does not disturb a user. The location manager 350 may manage location information of the electronic device. The graphic manager 351 may manage graphic effects to be provided to a user and user interfaces related to the graphic effects. The security manager 352 may provide all security functions required for system security or user authentication. According to an embodiment, when the electronic device (for example, electronic device 100) has a call function, the middleware 330 may further include a telephony manager for managing a voice call function or a video call function of the electronic device.

The middleware 330 may include a middleware module for forming a combination of various functions of the aforementioned components. The middleware 330 may provide modules specialized according to types of operating systems in order to provide differentiated functions. Further, the middleware 330 may dynamically remove some of the existing components or add new components.

The API 360 (for example, the API 145) is, for example, a set of API programming functions, and a different configuration thereof may be provided according to an operating system. For example, Android or iOS may provide one API set per platform, and Tizen may provide two or more API sets per platform.

The applications 370 (for example, the application programs 147) may include, for example, one or more applications which can provide functions such as home 371, dialer 372, SMS/MMS 373, Instant Message (IM) 374, browser 375, camera 376, alarm 377, contacts 378, voice dialer 379, e-mail 380, calendar 381, media player 382, album 383, clock 384, health care (for example, measure exercise quantity or blood sugar), or environment information (for example, atmospheric pressure, humidity, or temperature information).

According to an embodiment, the applications 370 may include an application (hereinafter, referred to as an "information exchange application" for convenience of the description) supporting information exchange between the electronic device (for example, the electronic device 100) and an external electronic device. The information exchange application may include, for example, a notification relay application for transferring predetermined information to an external electronic device or a device management application for managing an external electronic device.

For example, the notification relay application may include a function of transferring, to the external electronic device, notification information generated from other applications of the electronic device 100 (for example, an SMS/MMS application, an e-mail application, a health management application, or an environmental information application). Further, the notification relay application may receive notification information from, for example, a control device and provide the received notification information to the user. The device management application may manage (for example, install, delete, or update), for example, a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 370 may include an application (for example, health management application) designated according to attributes of the external electronic device (for example, attributes of the electronic device such as the type of electronic device which corresponds to a mobile medical device). According to an embodiment, the applications 370 may include an application received from the external electronic devices (for example, the server or the electronic device). According to an embodiment, the applications 370 may include a preloaded application or a third party application which can be downloaded from the server. The names of the components of the program module 310 according to the embodiment illustrated in FIG. 3 may vary according to the type of operating system.

According to various embodiments, at least some of the programming module 310 may be implemented by software, firmware, hardware, or a combination of two or more thereof. At least some of the programming module 310 may be implemented (for example, executed) by, for example, the processor (for example, the application program). At least some of the programming module 310 may include, for example, a module, program, routine, sets of instructions, or process for performing one or more functions.

Figure 4A:
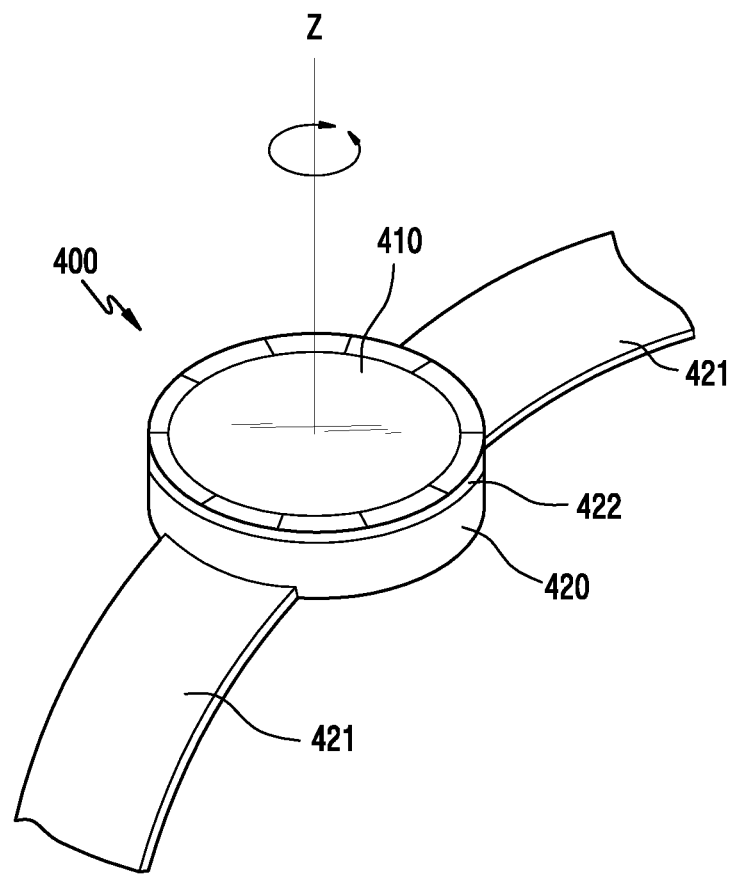
FIGS. 4A and 4B are diagrams illustrating an example electronic device according to various example embodiments of the present disclosure.
Figure 4B:
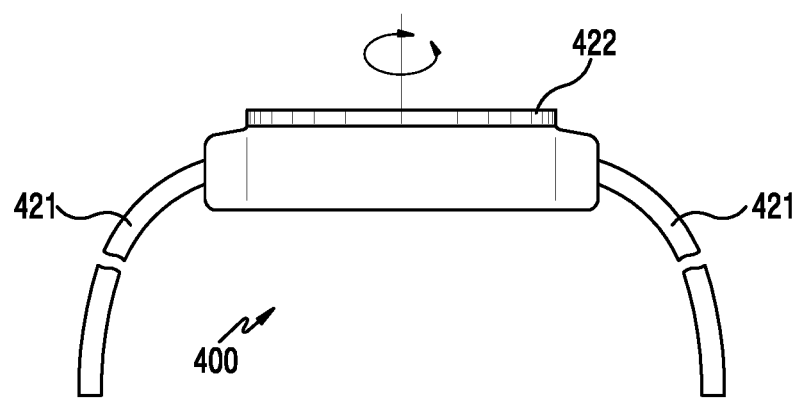

FIGS. 4A and 4B are diagrams illustrating an example electronic device according to various example embodiments of the present disclosure.

FIG. 4A is a perspective view of the electronic device according to the various example embodiments of the present disclosure.

Referring to FIG. 4A, the electronic device 400 (e.g., the electronic device 101 of FIG. 1) may be a wrist wearable electronic device capable of being worn on a user's wrist.

According to various embodiments of the present disclosure, the electronic device 400 may include a main body 420 and a connection part 421 (e.g., a strap) that is mounted to the main body 420. According to various embodiments of the present disclosure, the electronic device 400 may include a battery (e.g., a rechargeable battery, etc.) therewithin as a power supply means. The electronic device 400 may be implemented to be selectively mounted in a portable charging cradle (not illustrated) and to charge the battery.

According to various embodiments of the present disclosure, the main body 420 may include a display 410 and/or at least one key button (not illustrated). The display 410 may include a touch screen and may receive a touch input. According to various embodiments of the present disclosure, the main body 420 may be roughly cylindrical and may have a rotating body 422 (e.g., a rotary input) that is mounted thereto and is capable of adjusting an environment of various user interfaces displayed on the display 410. According to various embodiments of the present disclosure, the main body 420 may be roughly quadrangular, and is not limited thereto. The rotating body 422 may be rotatably installed on a lower surface, an upper surface, and a lateral surface of the main body 420. For example, the rotating body 422 may be disposed at a bezel part surrounding the edge of the display 410 disposed on the upper surface of the main body 420. The rotating body 422 may be rotatably installed on the connection part 421. According to various embodiments of the present disclosure, the rotating body 422 may be rotated clockwise or counterclockwise around the z-axis as a rotation axis, and may be configured to be limited to a maximum rotation amount (e.g., a maximum of 360 degrees) so as to be rotated within a predetermined range, or may be configured to be infinitely rotated. According to various embodiments of the present disclosure, the rotating body 422 may be disposed in a protrusion shape on the lateral surface of the main body 420 as in the case of a crown and may be rotated.

According to various embodiments of the present disclosure, when the user rotates the rotating body 422, the electronic device 400 may perform various functions according to a rotation parameter of the rotating body 422. For example, the electronic device 400 may detect the rotation parameter of the rotating body 422 by using at least one rotation recognition unit. For example, the multiple rotation recognition units may include an optical sensor that recognizes an optical pattern of the rotating body 422. As another example, the multiple rotation recognition units may include a sensor (e.g., a proximity sensor, a magnetic field sensor, etc.) capable of determining a rotation of the rotating body 422. According to various embodiments of the present disclosure, the rotation parameter may include at least one of a rotation direction, a rotation speed, a rotation amount, and a rotation position of the rotating body 422.

FIG. 4B is a side view of the electronic device according to various example embodiments of the present disclosure. Referring to FIG. 4B, the electronic device 400 may be worn in such a manner as to wrap the connection part 421 around the wrist in a state of putting the main body 420 on the wrist. The connection part 421 may include multiple openings (not illustrated) for matching the connection part 421 with the wrist, at predetermined intervals, and may adjust a wearing position so as to fit the user's wrist. According to various embodiments of the present disclosure, the connection part 421 may be formed of at least one material from among metal, leather, rubber, silicon, and urethane. The connection part 421 may be variously practiced and may be worn around a particular part (e.g., neck, ankle, wrist, etc.) of a human body.

Figure 5:
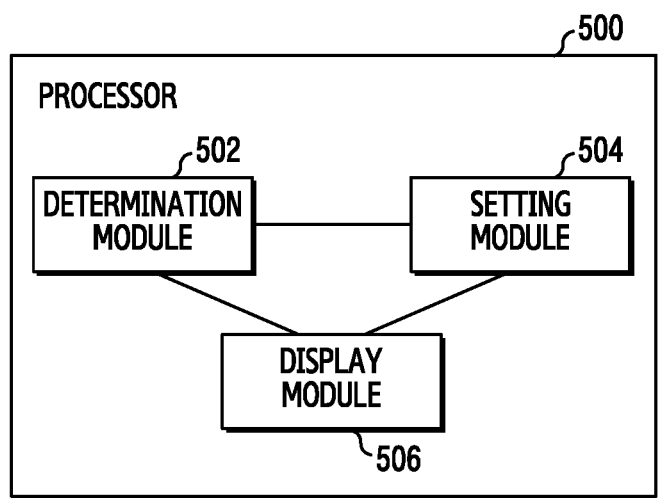
FIG. 5 is a block diagram illustrating an example configuration of a processor according to various example embodiments of the present disclosure.

FIG. 5 is a block diagram illustrating an example configuration of a processor 500 according to various example embodiments of the present disclosure.

According to various embodiments of the present disclosure, the processor 500 may be a processor (e.g., the processor 120) of an electronic device (e.g., the electronic device 101).

According to various embodiments of the present disclosure, the processor 500 may include a determination module 502, a setting module 504, and a display module 506.

According to various embodiments of the present disclosure, the determination module 502 may include circuitry configured to determine a time point of displaying a designated candidate reference position in response to a rotation input from a rotating body (e.g., the rotating body 422 of FIG. 4). According to an embodiment of the present disclosure, the determination module 502 may determine whether a designated input designated to display a reference position on a screen is sensed. For example, the determination module 502 may determine whether a position of guide information which is moved in response a rotation input coincides with a predesignated candidate reference position. As another example, the determination module 502 may determine whether a rotation pattern of the rotating body is sensed which corresponds to a pattern predesignated to display a reference position on the screen.

According to various embodiments of the present disclosure, the setting module 504 may include circuitry configured to set a reference position associated with a position of guide information on the basis of a result of the determination by the determination module 502. According to an embodiment of the present disclosure, the setting module 504 may set, as a reference position, a candidate reference position corresponding to an input satisfying a condition among predesignated candidate reference positions. According to various embodiments of the present disclosure, the setting module 504 may designate a candidate reference position on the basis of the position of the guide information which is moved in response to the rotation input from the rotating body. According to an embodiment of the present disclosure, the setting module 504 may designate, as a candidate reference position, an index which has been selected a predesignated number of times or more among indices on each of which guide information is displayed. According to another embodiment of the present disclosure, the setting module 504 may designate, as a candidate reference position, an index at which guide information is located at a time point of sensing an input satisfying a condition. According to various embodiments of the present disclosure, when an input which designates a particular index is sensed, the setting module 504 may designate, as a candidate reference position, an index corresponding to the input.

According to various embodiments of the present disclosure, the display module 506 may include circuitry configured to display guide information in response to the rotation of the rotating body. According to various embodiments of the present disclosure, the display module 506 may move the guide information from a reference position on the basis of rotation information. According to various embodiments of the present disclosure, the display module 506 may display a predesignated candidate reference position in response to an input satisfying a condition. According to various embodiments of the present disclosure, the display module 506 may change at least one of candidate reference positions as a reference position in response to a rotation input from the rotating body, and may display guide information on the basis of the changed reference position.

According to various embodiments of the present disclosure, at least one of the determination module 502, the setting module 504, and the display module 506 may be omitted from a configuration of the processor 500, and the processor 500 may additionally include another element. According to various embodiments of the present disclosure, the determination module 502, the setting module 504, and the display module 506 of the processor 500 may include at least one software element executed by the processor 500.

The electronic device according to various embodiments of the present disclosure may include a housing; a rotatable mechanical or capacitive input configured to be mounted on a part of the housing; a display configured to be exposed out of a part of the housing; a memory; and a processor configured to be electrically connected to the memory, the input, and the display. According to an embodiment of the present disclosure, the memory may store instructions that, when executed by the processor, cause the processor to display, on the display, at least one part of a user interface including a first point capable of scrolling an object and/or a number in proportion to a rotation of the input unit; to at least partially respond to a first input from the input unit or the display and to display, on the display, a second point spaced by a selected distance or angle from the first point; and to move the object to the second point or to display, on the display, a corresponding number at the second point, in response to the rotation of the input unit in a state of displaying the second point.

According to various embodiments of the present disclosure, the instructions cause the processor to scroll the object and/or the number in proportion to the rotation of the input unit from the second point after moving the object to the second point in response to the rotation of the input unit in the state of displaying the second point.

According to various embodiments of the present disclosure, the display may be circular. According to various embodiments of the present disclosure, the input unit may include a crown or a wheel structure surrounding the display.

According to various embodiments of the present disclosure, when the processor displays the at least two second points, the instructions may cause the processor to display the two second points sequentially in a predesignated scheme.

According to various embodiments of the present disclosure, the instructions may cause the processor to move the object to the second point displayed on a screen among the at least two second points or to display, on the display, a corresponding number at the second point displayed on the screen, in response to the rotation of the input unit.

According to various embodiments of the present disclosure, the instructions may cause the processor to sense an additional input and to designate the second point, after displaying the object.

According to various embodiments of the present disclosure, the instructions may cause the processor to display the second point corresponding to a first condition when the processor senses the first input corresponding to the first condition, and may cause the processor to display the second point corresponding to a second condition when the processor senses the first input corresponding to the second condition. According to an embodiment of the present disclosure, the first condition and the second condition may be associated with the number of the second points.

Figure 6:
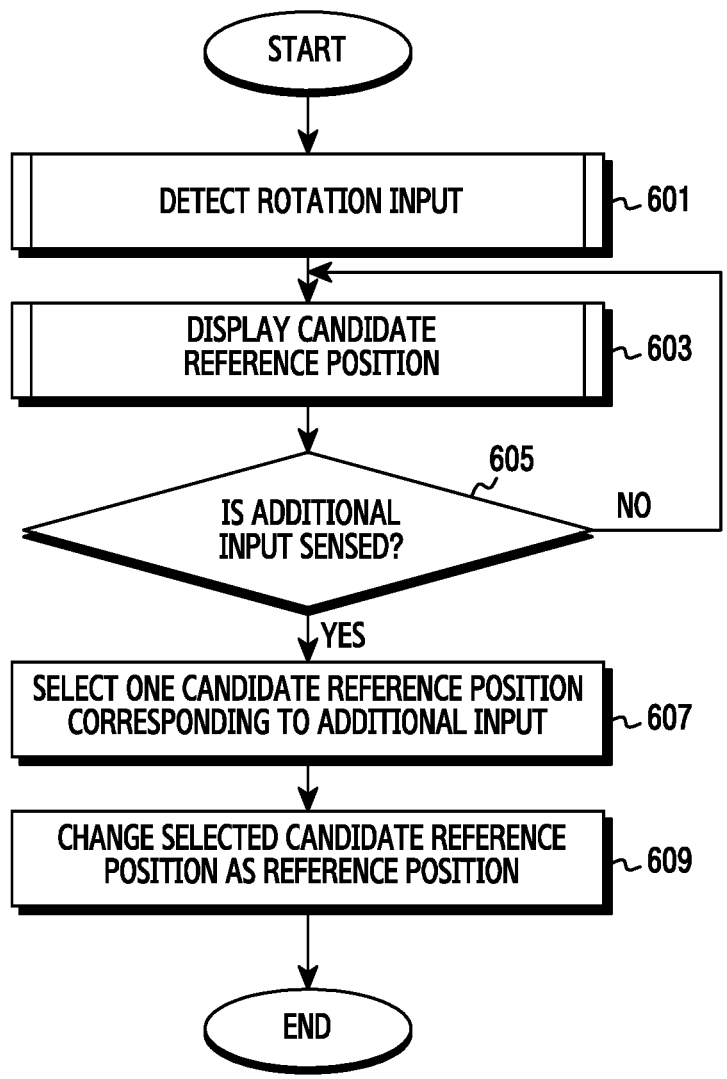
FIG. 6 is a flowchart illustrating example execution operations of a method for recognizing a rotation of a rotating body according to various example embodiments of the present disclosure.

FIG. 6 is a flowchart illustrating example execution operations of a method for recognizing a rotation of a rotating body (e.g., the rotating body 422 of FIG. 4) by the electronic device 101 according to various example embodiments of the present disclosure. According to an embodiment of the present disclosure, the electronic device 101 may be the electronic device 201, the processor 120, and the processor 500.

According to various embodiments of the present disclosure, the electronic device 101 may recognize the rotation of the rotating body and may display guide information. According to an embodiment of the present disclosure, the guide information may include an indicator which displays an object selected by an input among objects (e.g., menus, items, etc.) displayed on the screen. According to another embodiment of the present disclosure, the guide information may include an indicator which displays the degree of the rotation of the rotating body on the screen.

In operation 601, the electronic device 101 may detect a rotation input from the rotating body. According to various embodiments of the present disclosure, the electronic device 101 may sense a rotation input from the rotating body in a state where the screen (e.g., the display 160 of FIG. 1) of the electronic device 101 is turned on or is turned off. According to an embodiment of the present disclosure, the electronic device 101 may detect at least one of rotation parameters (e.g., a rotation direction, a rotation speed, a rotation amount, and a rotation position) of the rotating body which physically rotates.

In operation 603, the electronic device 101 may display a candidate reference position on the screen. According to various embodiments of the present disclosure, a reference position may be associated with the position of guide information displayed on the screen. For example, the reference position may be a position at which the movement of the guide information begins. When the electronic device 101 senses the rotation input from the rotating body, for example, the electronic device 101 may identify a movement distance of the guide information on the basis of a rotation amount of the rotating body, and may move the guide information from the reference position by the identified movement distance and may display the guide information moved by the identified movement distance. As another example, the electronic device 101 may identify a movement direction of the guide information on the basis of a rotation direction of the rotating body, and may move the guide information from the reference position in the identified direction and may display the guide information moved in the identified direction. According to an embodiment of the present disclosure, candidate reference positions may be candidates capable of being selected as a reference position. According to an embodiment of the present disclosure, the electronic device 101 may display a candidate reference position by using a graphic effect. For example, the electronic device 101 may display an icon representing the candidate reference position at a predesignated position (e.g., the twelve o'clock direction, the three o'clock direction, etc.). According to another embodiment of the present disclosure, the electronic device 101 may display the candidate reference position by using an audio effect, a vibration effect, a light-emitting effect, and the like.

In operation 605, the electronic device 101 may determine whether an additional input is sensed. According to various embodiments of the present disclosure, the additional input may be an input for selecting one of the candidate reference positions displayed on the screen. According to an embodiment of the present disclosure, the additional input may be a rotation input from the rotating body which is generated in the state of displaying the candidate reference position. According to another embodiment of the present disclosure, the additional input may be at least one of a voice input, a gesture input, a touch input, and a sensor input which are generated in the state of displaying the candidate reference position.

In operation 607, the electronic device 101 may identify or select one candidate reference position corresponding to the additional input.

In operation 609, the electronic device 101 may change the selected candidate reference position as a reference position. According to various embodiments of the present disclosure, the electronic device 101 may display guide information corresponding to the rotation input or may move the displayed guide information, on the basis of the changed reference position.

Figure 7:
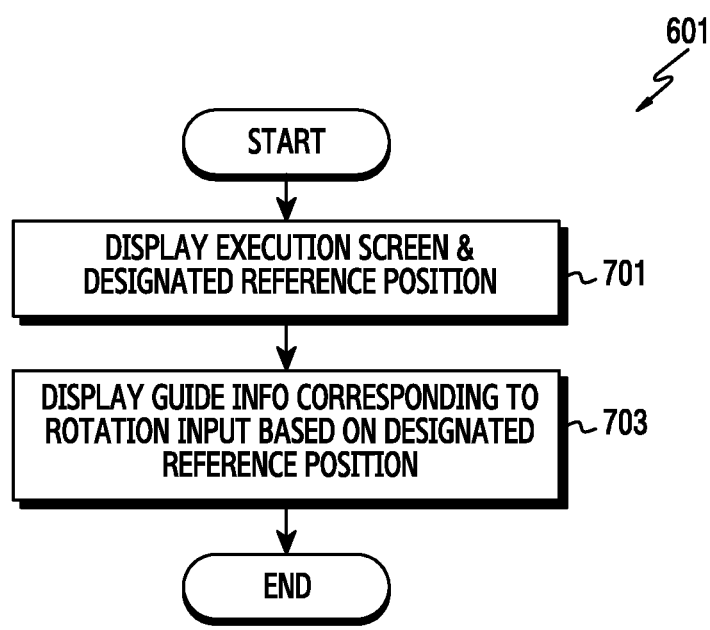
FIG. 7 is a flowchart illustrating example execution operations of a method for displaying guide information by an electronic device according to various example embodiments of the present disclosure.

FIG. 7 is a flowchart illustrating example execution operations of a method for displaying guide information by the electronic device 101 according to various example embodiments of the present disclosure. According to an embodiment of the present disclosure, the electronic device 101 may be the electronic device 201, the processor 120, and the processor 500.

According to various embodiments of the present disclosure, an execution process of the method for displaying guide information may be detailed operations of operation 601 illustrated in FIG. 6.

In operation 701, the electronic device 101 may display an execution screen and a designated reference position. According to an embodiment of the present disclosure, the designated reference position may be a reference position currently designated by the electronic device 101 or a user. According to various embodiments of the present disclosure, the designated reference position may be associated with a sequential order of an index including at least one object. According to an embodiment of the present disclosure, the electronic device 101 may display a phone book screen which is formed by indices which are based on initial phonemes of stored names. In this case, the electronic device 101 may identify the designated reference position on the basis of an index selected by the user or predesignated index order (e.g., alphabetical order, preference order, etc.).

In operation 703, the electronic device 101 may display guide information corresponding to a rotation input on the basis of the designated reference position. For example, the electronic device 101 may identify movement information (e.g., a movement distance, a movement direction, etc. of the guide information) of the guide information on the basis of rotation information of the rotating body (e.g., the rotating body 422 of FIG. 4), and may move the guide information on the basis of the reference position.

Figure 8:
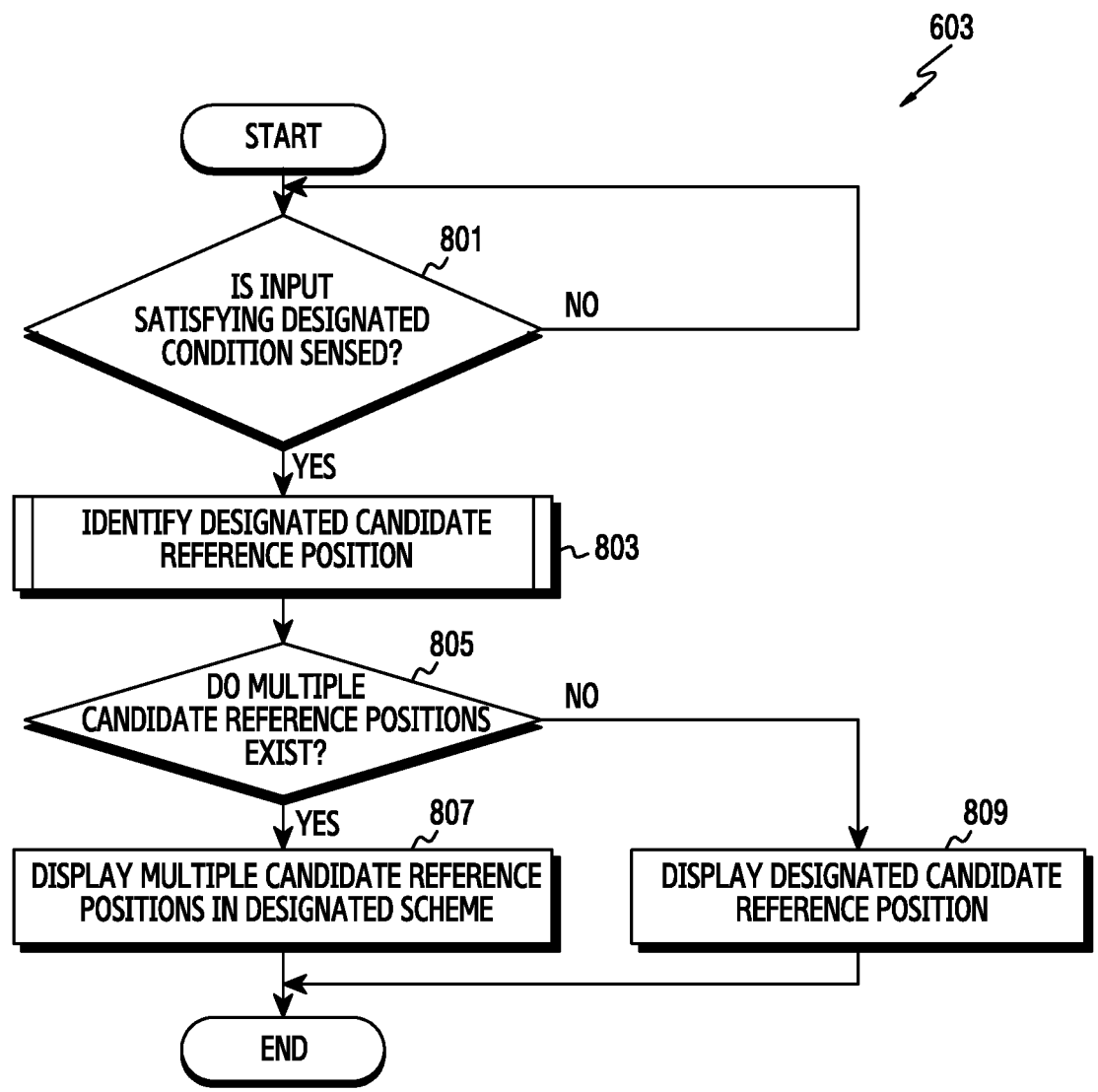
FIG. 8 is a flowchart illustrating example execution operations of a method for displaying a candidate reference position by an electronic device according to various example embodiments of the present disclosure.

FIG. 8 is a flowchart illustrating example execution operations of a method for displaying a candidate reference position by the electronic device 101 according to various example embodiments of the present disclosure. According to an embodiment of the present disclosure, the electronic device 101 may be the electronic device 201, the processor 120, and the processor 500.

According to various embodiments of the present disclosure, an execution process of the method for displaying a candidate reference position may be detailed operations of operation 603 illustrated in FIG. 6.

In operation 801, the electronic device 101 may sense an input satisfying a designated condition. For example, the input satisfying the designated condition may be an input designated to display a designated candidate reference position on the screen.

According to an embodiment of the present disclosure, when guide information is moved to at least one designated candidate reference position due to the rotation of the rotating body (e.g., the rotating body 422 of FIG. 4), the electronic device 101 may determine the sensing of the input satisfying the condition. For example, the electronic device 101 may move guide information on the basis of rotation information, and may display the designated candidate positions when a position of the moved guide information coincides with at least one candidate reference position. According to another embodiment of the present disclosure, when the electronic device 101 senses a rotation pattern (e.g., rotating in a second direction after rotating in a first direction) of the rotating body corresponding to a predesignated pattern, the electronic device 101 may determine the sensing of the input satisfying the condition. According to still another embodiment of the present disclosure, when the electronic device 101 senses an input designated for an input means other than the rotating body, the electronic device 101 may determine the sensing of the input satisfying the condition. According to an embodiment of the present disclosure, an input from another input means may include at least one of a touch input, a key button input, a gesture input, and a voice input.

In operation 803, the electronic device 101 may identify a designated candidate reference position.

In operation 805, the electronic device 101 may determine whether multiple candidate reference positions exist.

When it is determined in operation 805 that the multiple candidate reference positions exist, in operation 807, the electronic device 101 may display the multiple candidate reference positions in a designated scheme.

According to an embodiment of the present disclosure, the electronic device 101 may cause respective attributes of the multiple candidate reference positions to be different, and may display the multiple candidate reference positions having the different attributes. Examples of the attribute may include an icon representing each candidate reference position, the size of the icon, the color of the icon, and the like. According to another embodiment of the present disclosure, the electronic device 101 may perform a process for sequentially displaying the icons respectively corresponding to the multiple candidate reference positions. According to an embodiment of the present disclosure, the electronic device 101 may perform a process for displaying the icons according to a predesignated order at designated time intervals (e.g., one second).

When it is determined in operation 805 that the one candidate reference position exists, in operation 809, the electronic device 101 may display the candidate reference position in a designated scheme.

According to various embodiments of the present disclosure, the electronic device 101 may display information on the candidate reference position together with the candidate reference position. For example, the electronic device 101 may display information (e.g., an index name, etc.) of an index, which is designated as the candidate reference position, together with the candidate reference position.

Figure 9:
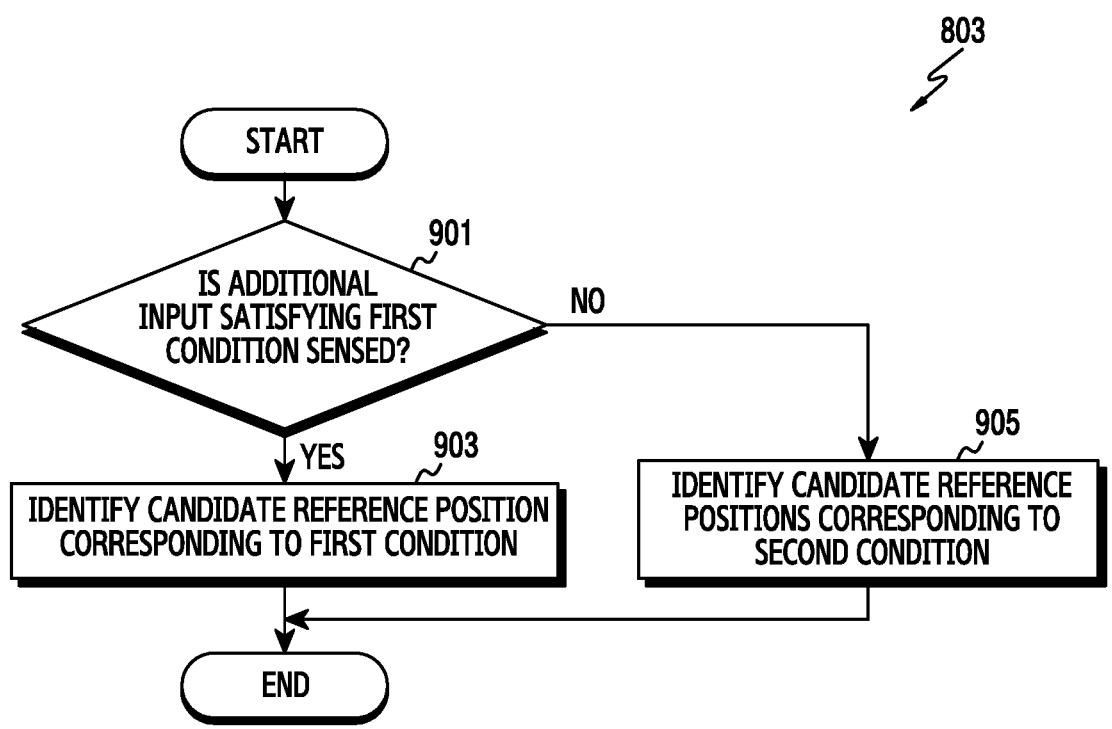
FIG. 9 is a flowchart illustrating example execution operations of a method for displaying a candidate reference position by an electronic device according to various example embodiments of the present disclosure.

FIG. 9 is a flowchart illustrating example execution operations of a method for displaying a candidate reference position by the electronic device 101 according to various example embodiments of the present disclosure. According to an embodiment of the present disclosure, the electronic device 101 may be the electronic device 201, the processor 120, and the processor 500.

According to various embodiments of the present disclosure, an execution process of the method for displaying a candidate reference position may be detailed operations of operation 803 illustrated in FIG. 8.

According to various embodiments of the present disclosure, the electronic device 101 may display candidate reference positions which depend on the type of an additional input. For example, the electronic device 101 may display candidate reference positions, the number of which depends on the type of the additional input.

In operation 901, the electronic device 101 may determine whether an additional input satisfying a first condition has been sensed. According to various embodiments of the present disclosure, the first condition may be associated with a rotation direction, a rotation speed, a rotation amount, a rotation pattern, and the like of the rotating body.

When it is determined in operation 901 that the additional input satisfying the first condition has been sensed, in operation 903, the electronic device 101 may identify a candidate reference position corresponding to the first condition. For example, the electronic device 101 may identify the candidate reference positions, the number (e.g., 3) of which corresponds to the first condition.

When it is determined in operation 901 that an additional input satisfying a second condition has been sensed, in operation 905, the electronic device 101 may identify candidate reference positions, the number (e.g., 5) of which corresponds to the second condition.

According to various embodiments of the present disclosure, the electronic device 101 may identify the candidate reference position corresponding to the type of the additional input, and may display the identified candidate reference position on the screen.

Figure 10:
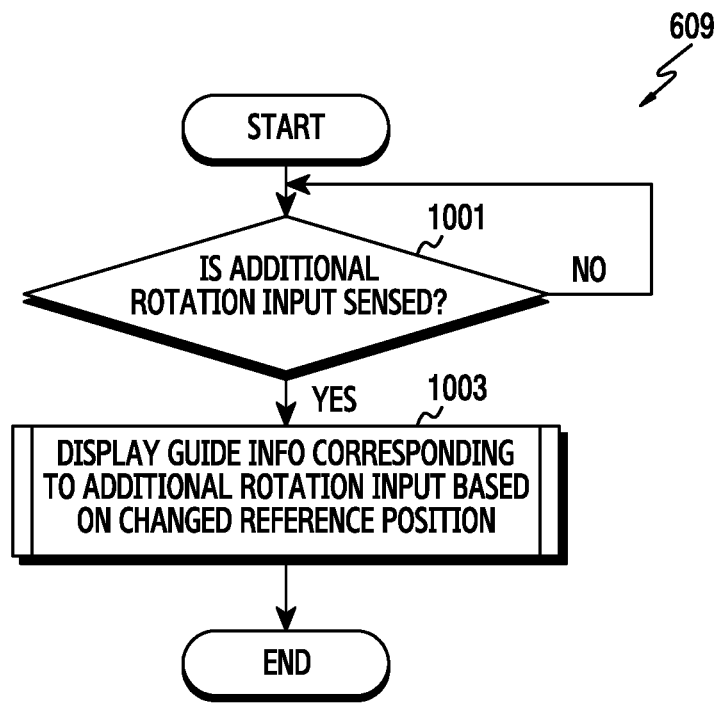
FIG. 10 is a flowchart illustrating example execution operations of a method for changing a reference position by an electronic device according to various example embodiments of the present disclosure.

FIG. 10 is a flowchart illustrating example execution operations of a method for changing a reference position by the electronic device 101 according to various example embodiments of the present disclosure. According to an embodiment of the present disclosure, the electronic device 101 may be the electronic device 201, the processor 120, and the processor 500.

According to various embodiments of the present disclosure, an execution process of the method for changing a reference position may be detailed operations of operation 609 illustrated in FIG. 6.

In operation 1001, the electronic device 101 may determine whether an additional rotation input has been sensed. According to an embodiment of the present disclosure, the electronic device 101 may change the previous reference position to a new reference position, and may then sense an additional input.

When it is determined in operation 1001 that the additional rotation input has been sensed, in operation 1003, the electronic device 101 may display guide information corresponding to the additional rotation input on the basis of the changed reference position. For example, the electronic device 101 may omit the movement of the guide information up to the changed reference position, and may move the guide information from the changed reference position.

Figure 11:
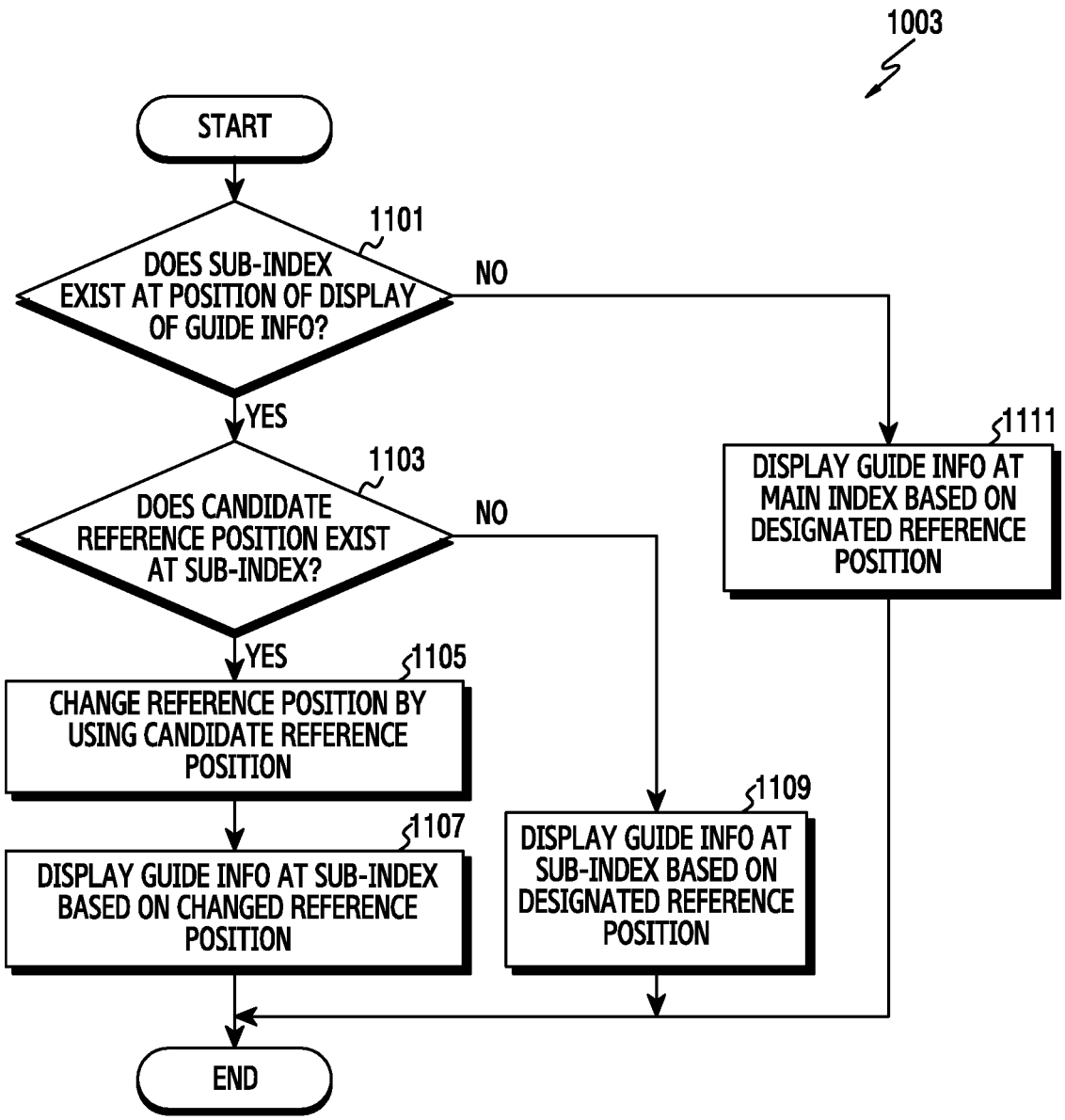
FIG. 11 is a flowchart illustrating example execution operations of a method for displaying guide information by an electronic device according to various example embodiments of the present disclosure.

FIG. 11 is a flowchart illustrating example execution operations of a method for displaying guide information by the electronic device 101 according to various example embodiments of the present disclosure. According to an embodiment of the present disclosure, the electronic device 101 may be the electronic device 201, the processor 120, and the processor 500.

According to various embodiments of the present disclosure, an execution process of the method for displaying guide information may be detailed operations of operation 1003 illustrated in FIG. 10.

In operation 1101, the electronic device 101 may determine whether a sub-index exists at a position of the display of guide information. According to various embodiments of the present disclosure, the electronic device 101 may determine whether a sub-index exists in an index at which the guide information is displayed among indices included in first information displayed on the screen. According to an embodiment of the present disclosure, the sub-index may be a part of the first information which is not displayed on the screen of the electronic device 101. For example, the sub-index may be at least one part of a previous screen of a first screen or a next screen thereof. As another example, the sub-index may include a recently-used object from among objects included in the first information, a frequently-used object from among the objects included in the first information, and the like.

When it is determined in operation 1101 that the sub-index exists, in operation 1103, the electronic device 101 may determine whether a candidate reference position exists at the sub-index.

When it is determined in operation 1103 that the candidate reference position exists at the sub-index, in operation 1105, the electronic device 101 may change a reference position using the candidate reference position of the sub-index. In addition, in operation 1107, the electronic device 101 may display the guide information at the sub-index on the basis of the changed reference position.

When it is determined in operation 1103 that the candidate reference position does not exist at the sub-index, in operation 1109, the electronic device 101 may display the guide information at the sub-index on the basis of a designated reference position.

When it is determined in operation 1101 that the sub-index does not exist at the position of the display of the guide information, in operation 1111, the electronic device 101 may display the guide information at a main index on the basis of the designated reference position.

Figure 12:
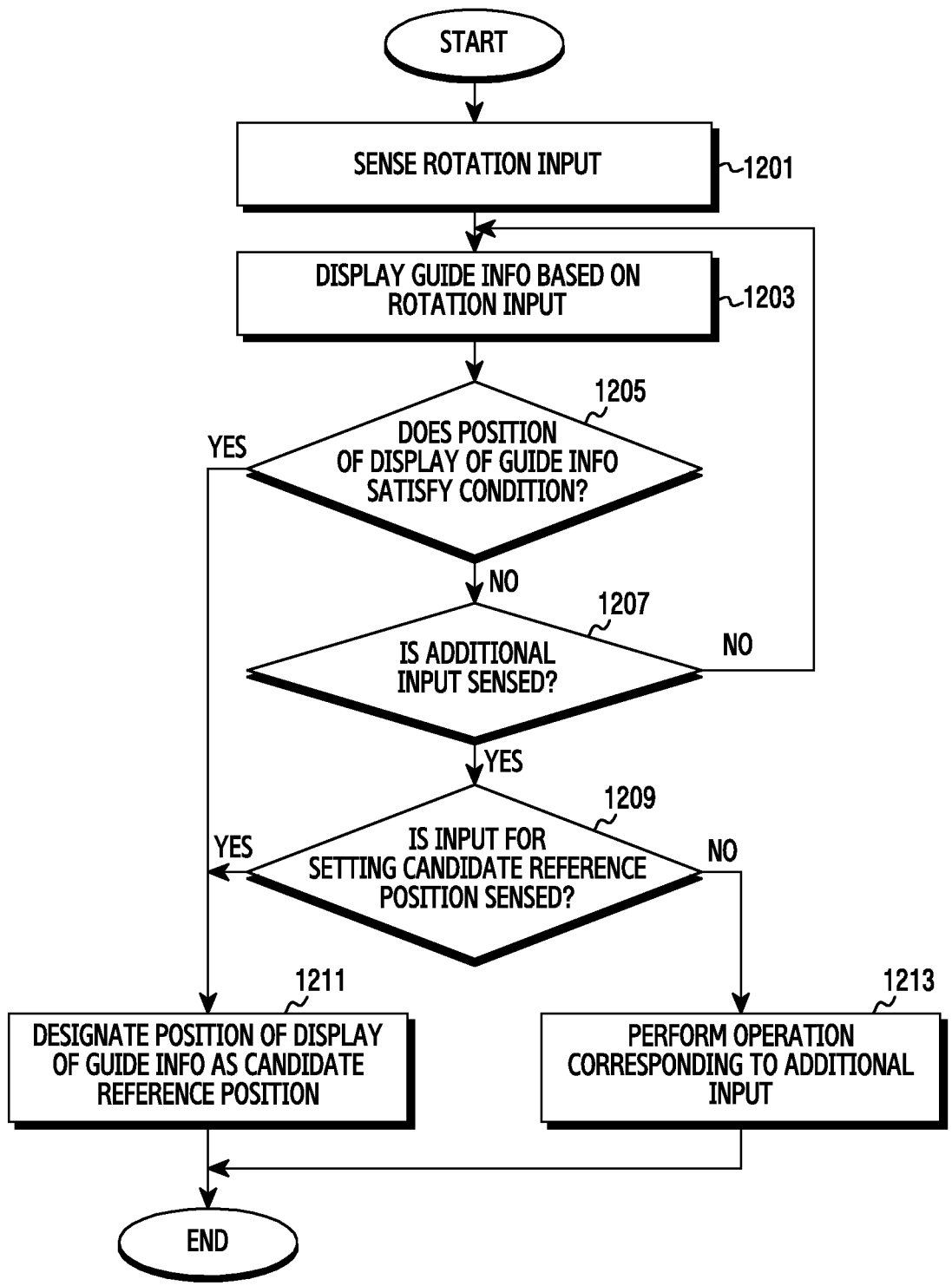
FIG. 12 is a flowchart illustrating example execution operations of a method for setting a reference position by an electronic device according to various example embodiments of the present disclosure.

FIG. 12 is a flowchart illustrating example execution operations of a method for setting a reference position by an electronic device 101 according to various example embodiments of the present disclosure.

In operation 1201, the electronic device 101 may sense a rotation input from the rotating body (e.g., the rotating body 422 of FIG. 4). According to various embodiments of the present disclosure, the electronic device 101 may detect at least one of a rotation direction, a rotation speed, a rotation amount, and a rotation position of the rotating body.

In operation 1203, the electronic device 101 may display guide information based on the rotation input.

In operation 1205, the electronic device 101 may determine whether a position of the display of the guide information satisfies a predesignated condition. According to an embodiment of the present disclosure, the predesignated condition may be associated with the frequency of use of an index. For example, when the number of times of selection of an index at which the guide information is displayed satisfies a predesignated number of times, the electronic device 101 may determine that a condition is satisfied. According to another embodiment of the present disclosure, the predesignated condition may be associated with a final position of the guide information before a rotation function of the rotating body stops.

When it is determined in operation 1205 that the position of the display of the guide information satisfies the predesignated condition, in operation 1211, the electronic device 101 may designate the position of the display of the guide information, as a candidate reference position.

When it is determined in operation 1205 that the position of the display of the guide information does not satisfy the predesignated condition, in operation 1207, the electronic device 101 may detect an additional input. According to an embodiment of the present disclosure, the additional input is an input for designating a candidate reference position, and may include at least one of a gesture input, a voice input, a key button input, and a touch input.

When it is determined in operation 1207 that the additional input has not been sensed, the electronic device 101 may perform the operation of displaying guide information. As another example, the electronic device 101 may again perform the operation of sensing an additional input.

When it is determined in operation 1207 that the additional input has been sensed, in operation 1209, the electronic device 101 may determine whether the additional input is an input for setting a candidate reference position.

When the input for setting the candidate reference position has been sensed in operation 1209, the electronic device 101 may designate the candidate reference position on the basis of the additional input. According to an embodiment of the present disclosure, in operation 1211, the electronic device 101 may designate the position of an index, at which the guide information is displayed, as the candidate reference position in response to the additional input. For example, the electronic device 101 may designate the candidate reference position on the basis of the additional input (e.g., a voice input (e.g., a voice saying "setting"), a gesture input (e.g., shaking from side to side), a touch input (e.g., a screen touch), etc.) which is sensed in the state of displaying the guide information. According to another embodiment of the present disclosure, the electronic device 101 may designate an index, which corresponds to the additional input, as the candidate reference position. For example, the electronic device 101 may designate an index, which is associated with S, as the candidate reference position on the basis of the additional input (e.g., a voice input (e.g., a voice saying "S"), a gesture input (e.g., a movement corresponding to the alphabet "S"), a touch input (e.g., a screen touch corresponding to the alphabet "S"), etc.).

When the input for setting the candidate reference position has not been sensed in operation 1209, in operation 1213, the electronic device 101 may perform an operation corresponding to the additional input. According to an embodiment of the present disclosure, the electronic device 101 may change the position of the guide information in response to the additional input.

Figure 13A:
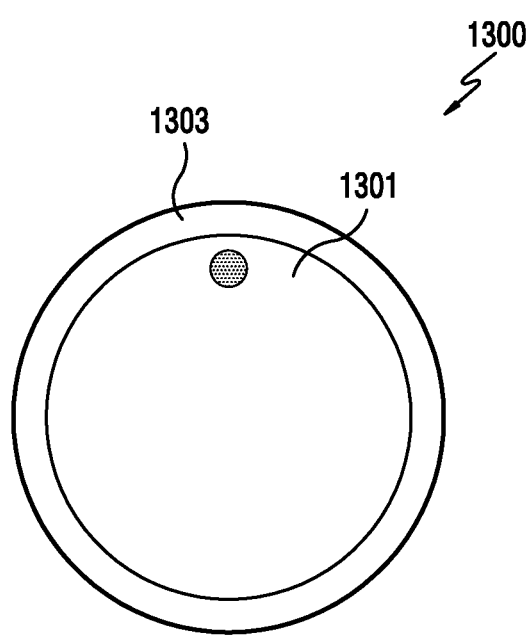
FIGS. 13A, 13B and 13C are diagrams illustrating an example screen configuration of an electronic device for displaying a candidate reference position according to various example embodiments of the present disclosure.
Figure 13B:
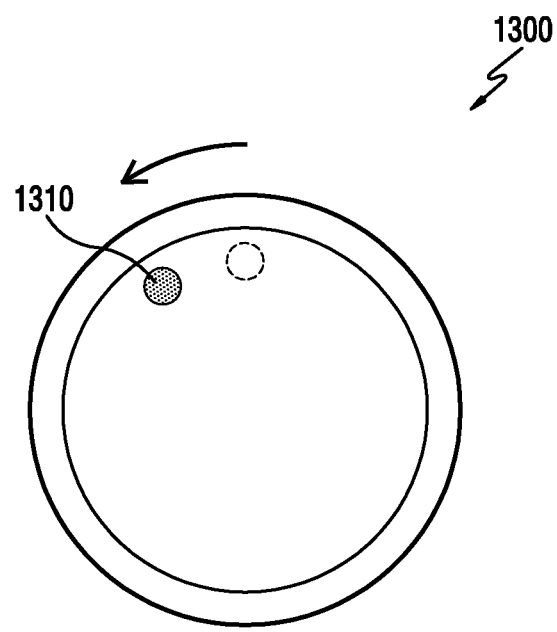
Figure 13C:
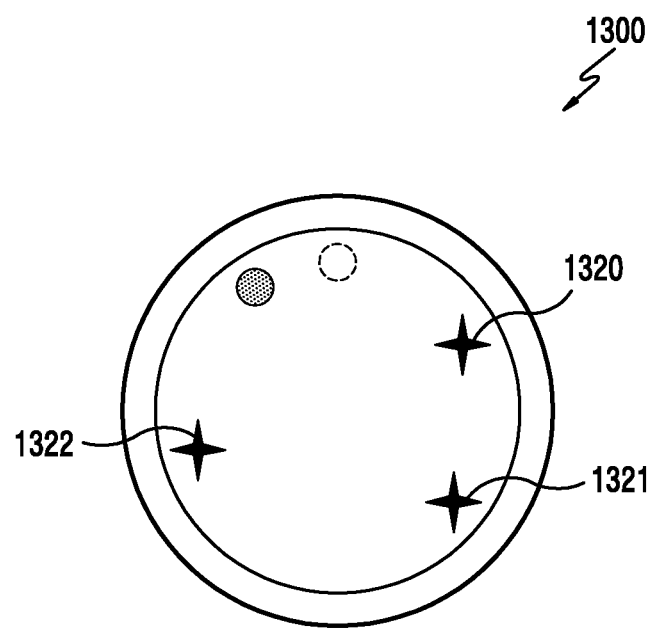

FIGS. 13A, 13B and 13C are diagrams illustrating an example screen configuration of an electronic device 1300 for displaying a candidate reference position according to various example embodiments of the present disclosure. According to an embodiment of the present disclosure, the electronic device 1300 may be the electronic device 101, the electronic device 201, the processor 120, and the processor 500. According to an embodiment of the present disclosure, the electronic device 1300 may be the respective elements (e.g., the processor 120 and the application processor 210) of the electronic device 101 and the electronic device 201.

According to various embodiments of the present disclosure, the electronic device 1300 may display (as indicated by reference numeral 1301) a circular guide information, which is movable in response to the rotation of a rotating body 1303, as illustrated in FIG. 13A. In addition, the electronic device 1300 may change the position of the displayed guide information in response to the rotation of the rotating body 1303. For example, the electronic device 1300 may move (as indicated by reference numeral 1310) the guide information in a first direction (e.g., a counterclockwise direction) in response to the rotation of the rotating body 1303 in the first direction, as illustrated in FIG. 13B. According to an embodiment of the present disclosure, a criterion of the movement (as indicated by reference numeral 1310) in the first direction may be as much movement as one gradation, and the electronic device 1300 may display the movable guide information when the rotating body is moved by one gradation in the first direction. According to an embodiment of the present disclosure, the electronic device 1300 may move the guide information with a designated reference position (e.g., the twelve o'clock direction) as a reference.

According to various embodiments of the present disclosure, the electronic device 1300 may change a reference position corresponding to a time point of the movement of the guide information. According to various embodiments of the present disclosure, the electronic device 1300 may display predesignated candidate reference positions 1320, 1321, and 1322, as illustrated in FIG. 13C, and may select at least one of the candidate reference positions 1320, 1321, and 1322 and may change a reference position. According to an embodiment of the present disclosure, the displayed candidate reference positions (e.g., the candidate reference positions 1320, 1321, and 1322) may be candidate reference positions predesignated by a user. According to another embodiment of the present disclosure, the displayed candidate reference position (e.g., the candidate reference position 1321) may be a candidate reference position located in a direction opposite to that of the position of the guide information among the predesignated candidate reference positions 1320, 1321, and 1322.

Figure 14A:
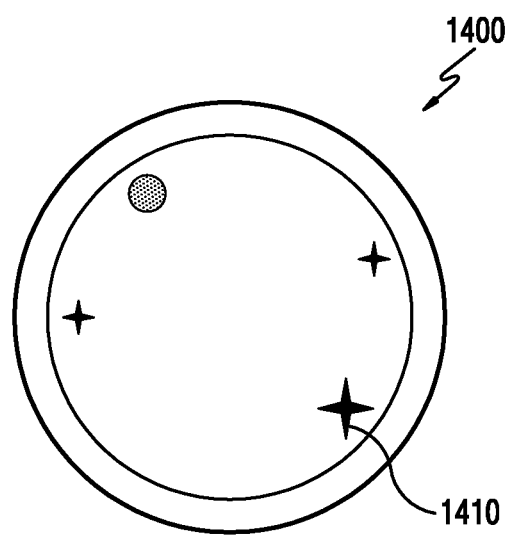
FIGS. 14A, 14B and 14C are diagrams illustrating an example screen configuration of an electronic device for changing a reference position according to various example embodiments of the present disclosure.
Figure 14B:
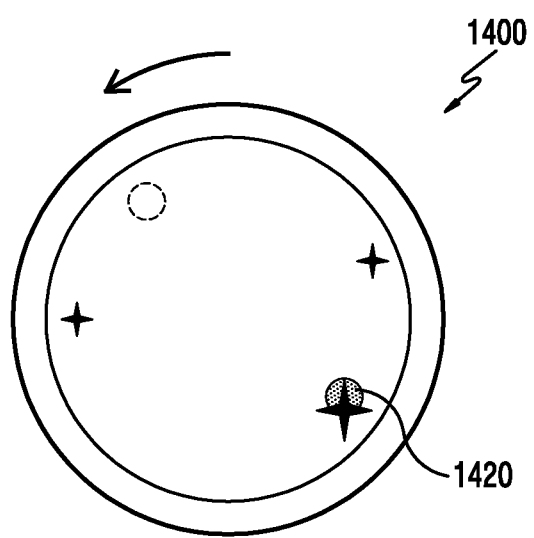
Figure 14C:
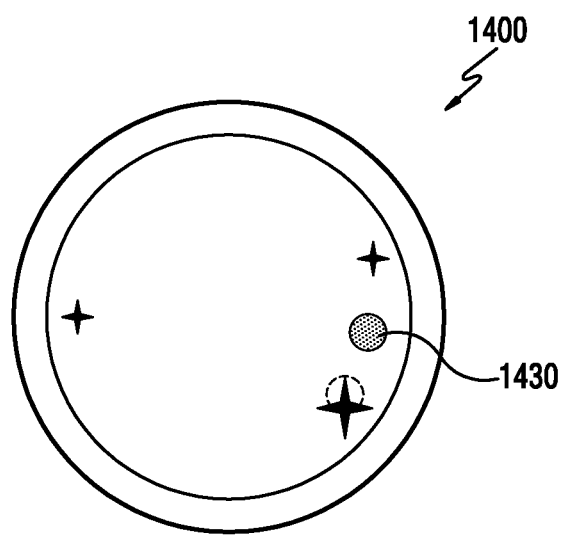

FIGS. 14A, 14B and 14C are diagrams illustrating an example screen configuration of an electronic device 1400 for changing a reference position according to various example embodiments of the present disclosure. According to an embodiment of the present disclosure, the electronic device 1400 may be the electronic device 101, the electronic device 201, and the processor 500. According to another embodiment of the present disclosure, the electronic device 1400 may be the respective elements (e.g., the processor 120 and the application processor 210) of the electronic device 101 and the electronic device 201.

According to various embodiments of the present disclosure, the electronic device 1400 may display a predesignated candidate reference position on the screen. According to an embodiment of the present disclosure, the electronic device 1400 may emphasize (e.g., magnify) and display the candidate reference position at predesignated time intervals (e.g., one second). According to an embodiment of the present disclosure, the electronic device 1400 may perform a process (e.g., reduce) for not emphasizing a candidate reference position, which is not emphasized at predesignated time intervals (e.g., one second), and may display the processed candidate reference position.

According to various embodiments of the present disclosure, the electronic device 1400 may change one candidate reference position, which is selected by an input among the displayed candidate reference positions, as a reference position.

For example, the electronic device 1400 may identify a reference position, which is to be changed, on the basis of a touch input for selecting at least one of the displayed candidate reference positions. As another example, the electronic device 1400 may identify a candidate reference position, which is emphasized and displayed at a time point of detecting an input for selecting a reference position, as a reference position to be changed. For example, when, as illustrated in FIG. 14A, the electronic device 1400 senses a rotation input from the rotating body (e.g., the rotating body 422 of FIG. 4) in the state of emphasizing (as indicated by reference numeral 1410) the candidate reference position designated in the five o'clock direction, the electronic device 1400 may change (as indicated by reference numeral 1420) the candidate reference position in the five o'clock direction as a reference position, as illustrated in FIG. 14B.

According to various embodiments of the present disclosure, the electronic device 1400 may change (as indicated by reference numeral 1430) the position of guide information with the changed reference position as a reference on the basis of an additional rotation of the rotating, as illustrated in FIG. 14C.

Figure 15:
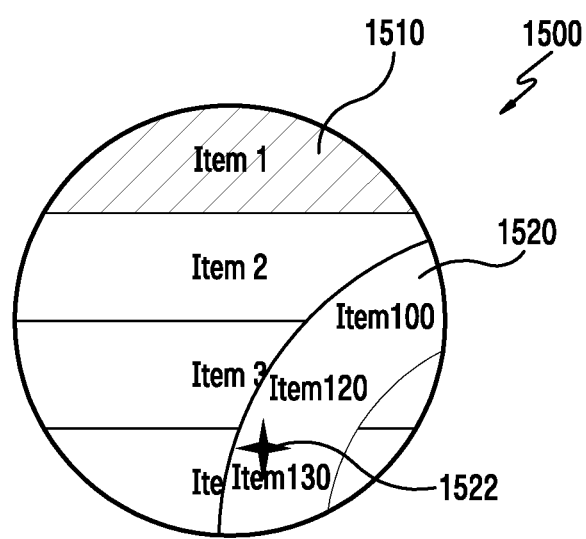
FIG. 15 is a diagram illustrating an example screen configuration of an electronic device for displaying guide information according to various example embodiments of the present disclosure.

FIG. 15 is a diagram illustrating an example screen configuration of an electronic device 1500 for displaying guide information according to various example embodiments of the present disclosure. According to an embodiment of the present disclosure, the electronic device 1500 may be the electronic device 101, the electronic device 201, and the processor 500. According to another embodiment of the present disclosure, the electronic device 1500 may be the respective elements (e.g., the processor 120 and the application processor 210) of the electronic device 101 and the electronic device 201.

According to various embodiments of the present disclosure, the electronic device 1500 may output first information including at least one index. The first information may be a phone book execution screen, and the index may be an initial phoneme of each name stored in a phone book.

According to various embodiments of the present disclosure, the electronic device 1500 may display the guide information in response to a rotation input from the rotating body (e.g., the rotating body 422 of FIG. 4). The guide information may display an index selected by the rotation input among indices included in a first screen. For example, the electronic device 1500 may output guide information 1510 in the form of shade as illustrated in FIG. 15, and may sense a rotation input and may sequentially move the guide information.

According to various embodiments of the present disclosure, the electronic device 1500 may determine whether a sub-index exists in an index at which the guide information is located, and may display a second screen 1520 formed by the at least one sub-index.

According to various embodiments of the present disclosure, the electronic device 1500 may output the guide information on the basis of a sub-index 1522 designated as a candidate reference position among the sub-indices displayed on the second screen 1520. For example, when a candidate reference position does not exist at the sub-indices displayed on the second screen 1520, the electronic device 1500 may sequentially move the guide information which is output on the second screen 1520 in response to the rotation input. As another example, when the candidate reference position exists at the sub-indices displayed on the second screen 1520, the electronic device 1500 may move the guide information, which is output on the second screen 1520 in response to the rotation input, with the candidate reference position as a start position.

Figure 16:
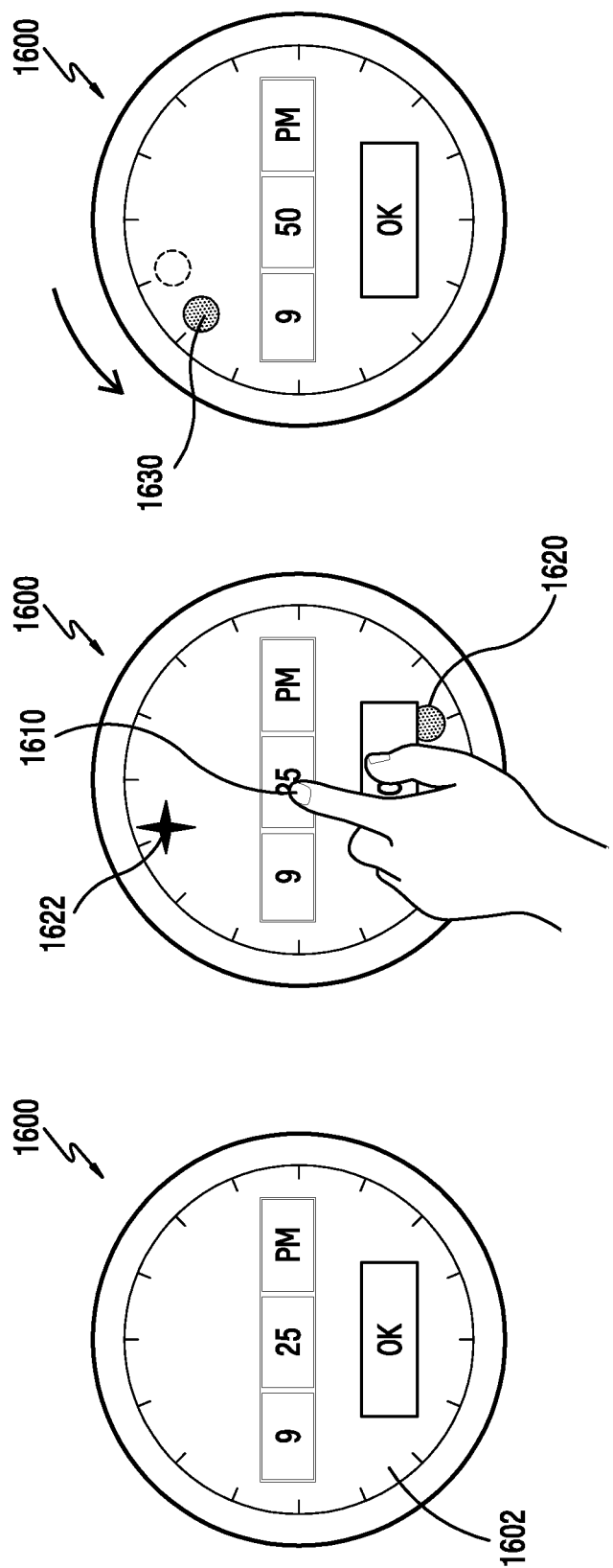
FIG. 16 is a diagram illustrating an example screen configuration of an electronic device for performing an alarm setting function according to various example embodiments of the present disclosure.

FIG. 16 is a diagram illustrating an example screen configuration of an electronic device 1600 for performing an alarm setting function according to various example embodiments of the present disclosure. According to an embodiment of the present disclosure, the electronic device 1600 may be the electronic device 101, the electronic device 201, and the processor 500. According to another embodiment of the present disclosure, the electronic device 1600 may be the respective elements (e.g., the processor 120 and the application processor 210) of the electronic device 101 and the electronic device 201.

According to various embodiments of the present disclosure, the electronic device 1600 may set (as indicated by reference numeral 1602) time information (e.g., hours and minutes) on a time point, at which an alarm is to be generated, on the basis of a user input. According to an embodiment of the present disclosure, the electronic device 1600 may sense a rotation of the rotating body and may sequentially change the time information. For example, the electronic device 1600 may sense a rotation input and may sequentially change hour information from 1 to 12, and may sense the rotation input and may sequentially change minute information from 1 to 60.

According to various embodiments of the present disclosure, the electronic device 1600 may set the time information by using a reference position and a candidate reference position. According to an embodiment of the present disclosure, the electronic device 1600 may display a candidate reference position on the basis of the currently-set time. According to an embodiment of the present disclosure, when the electronic device 1600 senses an input 1610 for setting minute information, as illustrated in FIG. 16, the electronic device 1600 may display (as indicated by reference numeral 1620) the currently-set 25 minutes as a reference position, and may display (as indicated by reference numeral 1622) 55 minutes, which corresponds to a position opposite to that of the 25 minutes, as a candidate reference position. According to an embodiment of the present disclosure, when the electronic device 1600 senses a rotation input in the state of displaying the reference position information, the electronic device 1600 may set minute information on the basis of the reference position. For example, the electronic device 1600 may increase or reduce the set time from the 25 minutes, which corresponds to the reference position, in response to the rotation input. According to another embodiment of the present disclosure, when the electronic device 1600 senses a rotation input in the state of displaying the candidate reference position, the electronic device 1600 may change the candidate reference position as a reference position and may set (as indicated by reference numeral 1630) minute information. For example, the electronic device 1600 may increase or reduce the set time from the 55 minutes, which corresponds to the changed reference position, in response to the rotation input.

According to various embodiments of the present disclosure, after the electronic device 1600 senses an input 1610 for setting minute information, the electronic device 1600 may change a time information setting item in response to an additional rotation of the rotating body sensed after the predesignated time. For example, the electronic device 1600 may set hour information in response to an additional rotation of the rotating body even in a state of not sensing an input for inputting hour information.

Figure 17:
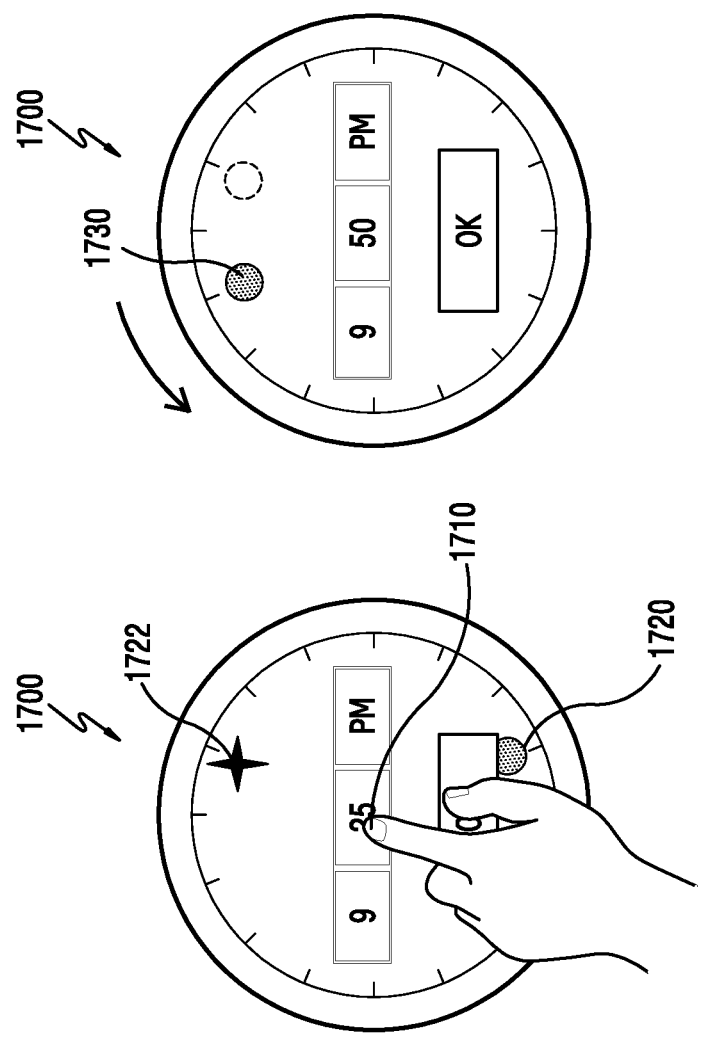
FIG. 17 is a diagram illustrating an example screen configuration of an electronic device for performing an alarm setting function according to various example embodiments of the present disclosure.

FIG. 17 is a diagram illustrating an example screen configuration of an electronic device for performing an alarm setting function according to various example embodiments of the present disclosure. According to an embodiment of the present disclosure, the electronic device 1700 may be the electronic device 101, the electronic device 201, and the processor 500. According to another embodiment of the present disclosure, the electronic device 1700 may be the respective elements (e.g., the processor 120 and the application processor 210) of the electronic device 101 and the electronic device 201.

According to various embodiments of the present disclosure, the electronic device 1700 may display a candidate reference position on the basis of frequently-set time. According to an embodiment of the present disclosure, when the electronic device 1700 senses an input 1710 for setting minute information, as illustrated in FIG. 17, the electronic device 1700 may display (as indicated by reference numeral 1720) the currently-set 25 minutes as a reference position, and may display (as indicated by reference numeral 1722) the time, which is set a designated number of times or more, as a candidate reference position. According to an embodiment of the present disclosure, the electronic device 1700 may increase or reduce the set time from the 25 minutes, which corresponds to the reference position, in response to a rotation input. According to another embodiment of the present disclosure, the electronic device 1700 senses a rotation input in the state of displaying the candidate reference position, the electronic device 1700 may change (as indicated by reference numeral 1730) the candidate reference position as a reference position and may set minute information.

Figure 18:
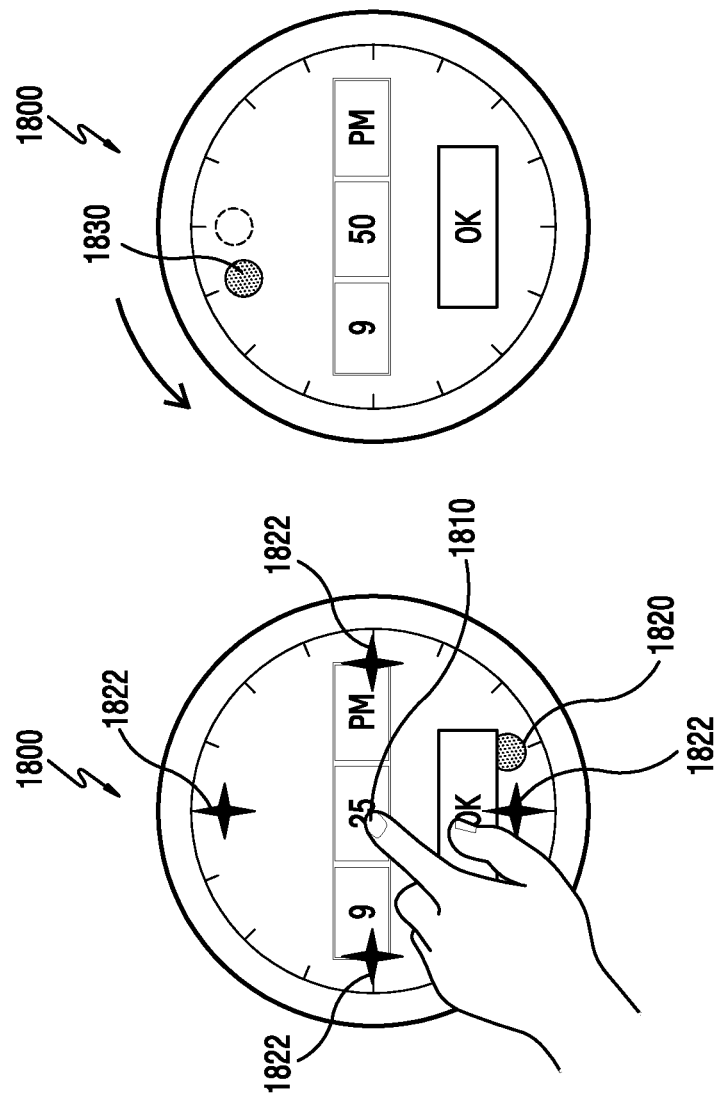
FIG. 18 is a diagram illustrating an example screen configuration of an electronic device for performing an alarm setting function according to various example embodiments of the present disclosure.

FIG. 18 is a diagram illustrating an example screen configuration of an electronic device for performing an alarm setting function according to various example embodiments of the present disclosure. According to an embodiment of the present disclosure, the electronic device 1800 may be the electronic device 101, the electronic device 201, and the processor 500. According to another embodiment of the present disclosure, the electronic device 1800 may be the respective elements (e.g., the processor 120 and the application processor 210) of the electronic device 101 and the electronic device 201.

According to various embodiments of the present disclosure, the electronic device 1800 may display candidate reference positions on the basis of a predesignated time interval. According to an embodiment of the present disclosure, when the electronic device 1800 senses an input 1810 for setting minute information, as illustrated in FIG. 18, the electronic device 1800 may display (as indicated by reference numeral 1820) the currently-set 25 minutes as a reference position, and may display (as indicated by reference numeral 1822) four candidate reference positions on the basis of a predesignated time interval (e.g., a time interval of 15 minutes). According to an embodiment of the present disclosure, the electronic device 1800 may increase or reduce the set time from the 25 minutes, which corresponds to the reference position, in response to a rotation input.

According to another embodiment of the present disclosure, when the electronic device 1800 senses a rotation input in the state of displaying the candidate reference position, the electronic device 1800 may change (as indicated by reference numeral 1830) the candidate reference position as a reference position and may set minute information.

An operating method of an electronic device according to various embodiments of the present disclosure may include displaying, on a display, at least one part of a user interface including a first point capable of scrolling an object and/or a number in proportion to a rotation of an input unit; at least partially responding to a first input from the input or the display and displaying, on the display, a second point spaced by a selected distance or angle from the first point; and moving the object to the second point or displaying, on the display, a corresponding number at the second point, in response to the rotation of the input unit in a state of displaying the second point.

According to various embodiments of the present disclosure, the operating method of the electronic device may include scrolling the object and/or the number in proportion to the rotation of the input unit from the second point after moving the object to the second point in response to the rotation of the input unit in the state of displaying the second point.

According to various embodiments of the present disclosure, the operating method of the electronic device may include sensing the rotation of the rotatable mechanical or capacitive input unit configured to be mounted on a part of a housing of the electronic device.

According to various embodiments of the present disclosure, the sensing of the rotation of the rotatable mechanical or capacitive input unit may include sensing the rotation of a crown or a wheel structure surrounding the display.

According to various embodiments of the present disclosure, the displaying of the second point on the display may include displaying the two second points sequentially in a predesignated scheme when the at least two second points are displayed.

According to various embodiments of the present disclosure, the operating method of the electronic device may include moving the object to the second point displayed on a screen among the at least two second points or displaying, on the display, a corresponding number at the second point displayed on the screen, in response to the rotation of the input unit.

According to various embodiments of the present disclosure, the operating method of the electronic device may include sensing an additional input and designating the second point, after displaying the object.

According to various embodiments of the present disclosure, the displaying of the second point on the display may include displaying the second point corresponding to a first condition when the first input corresponding to the first condition is sensed; and displaying the second point corresponding to a second condition when the first input corresponding to the second condition is sensed. According to an embodiment of the present disclosure, the first condition and the second condition may be associated with the number of the second points.

The method for recognizing a rotation of a rotating body and the electronic device for processing the same, according to various embodiments of the present disclosure, for example, can change a reference position of the display of guide information, and thereby can select a menu and an item while reducing the number of times of rotation of the rotating body.

A terminology "module" used for the present disclosure may refer, for example, to a unit including a combination of one or two or more among a hardware (e.g., circuitry), a software, or a firmware. A "module" may be interchangeably used with a terminology such as a unit, a logic, a logical block, a component, or a circuit, etc. A "module" may be a minimum unit of an integrally configured part or a portion thereof. A "module" may be a minimum unit performing one or more functions or a portion thereof. A "module" may be mechanically or electronically implemented. For example, a "module" according to the present disclosure may include at least one of an application-specific integrated circuit (ASIC) chip, a field-programmable gate arrays (FPGAs), or a programmable-logic device which are known, or to be developed in the future, and performing certain operations.

According to various embodiments, at least a portion of an apparatus (e.g., modules or functions thereof) or a method (e.g., operations) according to the present disclosure may be implemented as an instruction stored in a computer-readable storage media, for example, in the form of a programming module. An instruction, when executed by one or more processors (e.g., the processor 120), may allow the one or more processors to perform a function corresponding to the instruction. The computer-readable storage media may be, for example, the memory 130. At least a portion of a programming module may be implemented (e.g., executed) by, for example, the processor 120. At least a portion of the programming module may include, for example, a module, a program, a routine, sets of instructions, or a process, etc. for performing one or more functions.

The computer-readable storage media may include a hard disk, a magnetic media such as a floppy disk and a magnetic tape, Compact Disc Read Only Memory (CD-ROM), optical media such as Digital Versatile Disc (DVD), magneto-optical media such as a floptical disk, and a hardware device specially configured for storing and performing a program instruction (e.g., a programming module) such as Read Only Memory (ROM), Random Access Memory (RAM), a flash memory, etc. Also, the program instruction may include not only a machine language code generated by a compiler but also a high-level language code executable by a computer using an interpreter, etc. The above-described hardware device may be configured to operate as one or more software modules in order to perform an operation of the present disclosure, and vice versa.

A module or a programming module according to the present disclosure may include at least one of the above-described elements, omit a portion thereof, or further include additional other elements. Operations performed by a module, a programming module, or other elements according to the present disclosure may be executed in a sequential, parallel, or heuristic method. Also, a portion of the operations may be executed in a different sequence, omitted, or other operations may be added.

What is claimed is:

1. An electronic watch comprising:
a housing;
a rotary unit configured to be mounted on a part of the housing;
a display;
a processor operably coupled to the rotary unit, and the display; and
a memory operably coupled to the processor, wherein the memory stores instructions that, when executed by the processor, are configured to cause the electronic watch to:

display, on the display, a user interface including a guide object and at least one selectable candidate object that is separate and distinct from the guide object, the guide object displayed at a reference point of the user interface;

identify a first input for rotating the rotary unit, and in response to receiving the first input, move the guide object from the reference point to a first location of the user interface based on the first input; and identify a second input for selecting a candidate object among the at least one selectable candidate object, and in response to receiving the first input while the candidate object is selected by the second input, change the reference position by moving the guide object from the reference point to a second location where the selected one candidate object is displayed, and move the guide object from the changed reference point to a third location of the user interface based on and in response to receiving an additional first input.

2. The electronic watch as claimed in claim 1, wherein the memory stores instructions that, when executed by the processor, cause the electronic watch to move the guide object based on at least one of a rotation direction of the rotatable input, a rotation speed of the rotatable input, or a rotation amount of the rotary unit.

3. The electronic watch as claimed in claim 1, wherein the display is circular.

4. The electronic watch as claimed in claim 1, wherein the rotary unit includes a crown or a wheel structure surrounding the display.

5. The electronic watch as claimed in claim 1, wherein, when the electronic watch is configured to display the at least two candidate objects, the instructions cause the electronic watch to display the at least two candidate objects sequentially in a predesignated scheme.

6. The electronic watch as claimed in claim 1, wherein the instructions cause the electronic watch to display the at least one candidate object corresponding to a first condition when the processor senses the input corresponding to the first condition, and cause the electronic watch to display the at least one candidate object corresponding to a second condition when the processor senses the input corresponding to the second condition.

7. The electronic watch as claimed in claim 6, wherein the first condition and the second condition are associated with the number of the at least one candidate object.

8. A method of operating an electronic watch, the method comprising:

displaying, on a display of the electronic watch, a user interface including a guide object and at least one selectable candidate object that is separate and distinct from the guide object, the guide object displayed at a reference point of the user interface;

identifying a first input for rotating a rotary unit of the electronic watch, and in response to receiving the first input, moving the guide object from the reference point to a first location of the user interface based on the first input and displaying; and identifying a second input for selecting a candidate object among the at least one selectable candidate object, and in response to receiving the first input while the candidate object is selected by the second input, changing the reference position by moving the guide object from the reference point to a second location where the selected one candidate object is displayed, and moving the guide object from the changed reference point to a third location of the user interface based on and in response to receiving an additional first input.

9. The method as claimed in claim 8, wherein the guide object is moved based on at least one of a rotation direction of the rotatable input, a rotation speed of the rotatable input, or a rotation amount of the rotary unit.

10. The method as claimed in claim 8, wherein the display is circular.

11. The method as claimed in claim 10, wherein the rotary unit includes a crown or a wheel structure surrounding the display.

12. The method as claimed in claim 8, wherein the displaying of the user interface including the guide object and the at least one candidate object comprises displaying the at least two candidate object sequentially in a predesignated scheme when the at least two candidate objects are displayed.

13. The method as claimed in claim 8, wherein the displaying of the user interface including the guide object and the at least one candidate object comprises displaying the at least one candidate object corresponding to a first condition when the input corresponding to the first condition is sensed; and displaying the at least one candidate object corresponding to a second condition when the first input corresponding to the second condition is sensed.

14. The method as claimed in claim 13, wherein the first condition and the second condition are associated with the number of the at least one candidate object.

15. A non-transitory computer-readable recording medium having stored thereon a program which when executed cause processing circuitry to perform operations comprising:

displaying, on a display of the electronic device, a user interface including a guide object and at least one selectable candidate object that is separate and distinct from the guide object, the guide object displayed at a reference point of the user interface;

identifying a first input for rotating a rotary unit of the electronic watch, and in response to receiving the first input, moving the guide object from the reference point to a first location of the user interface based on the first input;

identifying a second input for selecting a candidate object among the at least one selectable candidate object, and in response to receiving the first input while the candidate object is selected by the second input, changing the reference position by moving the guide object from the reference point to a second location where the selected one candidate object is displayed, and moving the guide object from the changed reference point to a third location of the user interface based on and in response to receiving an additional first input.

* * * * *